US006765872B1

United States Patent
Tazaki

(10) Patent No.: US 6,765,872 B1
(45) Date of Patent: Jul. 20, 2004

(54) ROUTING APPARATUS AND A ROUTING METHOD

(75) Inventor: Yuji Tazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/431,460

(22) Filed: Nov. 1, 1999

(30) Foreign Application Priority Data

Mar. 1, 1999 (JP) .......................................... 11-052700

(51) Int. Cl.$^7$ .............................................. H04L 12/28
(52) U.S. Cl. ...................................... 370/235; 370/355
(58) Field of Search ................................. 370/351, 389, 370/392, 395.1, 395.21, 395.31, 400, 401, 409, 410, 241, 252, 464, 465, 468, 355, 230, 235

(56) References Cited

U.S. PATENT DOCUMENTS

| 5,649,108 A | * | 7/1997 | Spiegel et al. .............. 709/241 |
| 5,995,503 A | * | 11/1999 | Crawley et al. ............. 370/351 |
| 6,353,616 B1 | * | 3/2002 | Elwalid et al. ............. 370/443 |
| 6,400,681 B1 | * | 6/2002 | Bertin et al. ................ 370/218 |
| 2003/0133411 A1 | * | 7/2003 | Ise et al. .................... 370/230 |

OTHER PUBLICATIONS

Schill et al. "Resource Reservation in Advance in Heterogeneous Networks with Partial ATM Infrastructures". IEEE INFOCOM. Apr. 7–12, 1997. pp. 611–618.*

Braden et al. "Resource ReSerVation Protocol (RSVP)—Version 1 Functional Specification". IETF RFC 2205. Network Working Group. Sep. 1997.*

Schelen et al. "An Agent–based Architecture for Advanced Reservations". IEEE Local Computer Networks. Nov. 2–5, 1997. pp. 452–459.*

Guerin et al. "QoS path Management with RSVP". IEEE Global Telecommunications Conference. Nov. 3–8, 1997. pp. 1914–1918.*

* cited by examiner

Primary Examiner—Chi Pham
Assistant Examiner—Derrick W Ferris
(74) Attorney, Agent, or Firm—Katten Muchin; Zavis Rosenman

(57) ABSTRACT

A routing apparatus comprises a resource management unit holding resource management information for managing a state of use of a communication resource in another routing apparatus that can be an adjacent routing apparatus transferred a packet data. When packet data for a reservation request is received, a determining unit determines the adjacent routing apparatus on the basis of destination information given to the packet data and the resource management information in the resource management unit to control a routing (packet transfer). A routing process at the time of reception of a request for reserving a resource (communication resource) is performed in consideration of a state of use of a resource in the adjacent routing apparatus, thereby preventing a wasteful routing at the time of resource reservation.

13 Claims, 15 Drawing Sheets

| DESTINATION IP ADDRESS | OUTPUT VPI | OUTPUT VCI |
|---|---|---|
| a1 | VPI 6 | VCI 6 |
| b1 | VPI 7 | VCI 7 |
| c1 | VPI 8 | VCI 8 |
| d1 | VPI 9 | VCI 9 |
| e1 | VPI 10 | VCI 10 |

| INPUT VPI | INPUT VCI | OUTPUT VPI | OUTPUT VCI |
|---|---|---|---|
| VPI 1 | VCI 1 | VPI 6 | VCI 6 |
| VPI 2 | VCI 2 | VPI 7 | VCI 7 |
| VPI 3 | VCI 3 | VPI 8 | VCI 8 |
| VPI 4 | VCI 4 | VPI 9 | VCI 9 |
| VPI 5 | VCI 5 | VPI 10 | VCI 10 |

| 22E-2 | 22E-1 | | | |
|---|---|---|---|---|
| BANDWIDTH FOR RSVP | INPUT VPI | INPUT VCI | OUTPUT VPI | OUTPUT VCI |
| 64K | VPIa | VCIa | OVPIa | OVCIa |
| 1M | VPIb | VCIb | OVPIb | OVCIb |
| 10M | VPIc | VCIc | OVPIc | OVCIc |
| 128K | VPId | VCId | OVPId | OVCId |
| 5M | VPIe | VCIe | OVPIe | OVCIe |

| BANDWIDTH FOR RSVP | INPUT VPI | INPUT VCI | OUTPUT VPI | OUTPUT VCI |
|---|---|---|---|---|
| 10 M | 0 | 10 | 10 | 20 |
| 3 M | 5 | 120 | 30 | 40 |
| 1 M | 54 | 58 | 55 | 58 |

| | DESTINATION IP ADDRESS | NEXT ROUTER | BANDWIDTH |
|---|---|---|---|
| 1 | a1 | A | 64 K |
| 2 | b1 | B | 1 M |
| 3 | c1 | C | 10 M |
| 4 | d1 | D | 128 K |
| 5 | e1 | E | 5 M |

22B-1 / 22B-2 / 22B

BANDWIDTH CAN BE SECURED IN NEXT ROUTER.
→ #3 IS RELEVANT ADDRESS, ACCEPTABLE THE BANDWIDTH.

FIG. 12B

| | DESTINATION IP ADDRESS | NEXT ROUTER | BANDWIDTH |
|---|---|---|---|
| 1 | a1 | A | 64 K |
| 2 | b1 | B | 1 M |
| 3 | c1 | C | 6 M |
| 4 | d1 | D | 128 K |
| 5 | e1 | E | 5 M |

22B

NEXT ROUTER CAN SECURE BANDWIDTH #3 IS
→ RELEVANT ADDRESS, CHANGE THE BANDWIDTH.
10M - 4M → 6M

ROUTING APPARATUS AND A ROUTING METHOD

BACKGROUND OF THE INVENTION (1) Field of the Invention

The present invention relates to a routing apparatus and a routing method, in particular, to a routing apparatus and a routing method suitable for use when it is necessary to reserve a resource (for example, a resource relating to a communication such as a bandwidth and the like) at the time of communication in a communication network performing TCP/IP (Transmission Control Protocol/Internet Protocol) communication.

(2) Description of the Related Art

In order to furnish services strict with delay [for example, VOD (Video On Demand), voice service and the like] using IP over the Internet, it is necessary to secure a resource (bandwidth, mainly) for the communication service. To cope with it, there is a protocol for reserving a resource called RSVP (Resource Reservation Protocol) defined by IETF (Internet Engineering Task Force).

RSVP is a technique for securing a predetermined necessary bandwidth for a session (connection) established between a sender and a receiver of data (packet) in TCP/IP layer and assign it [guaranteeing predetermined QoS (Quality of Service)]. However, RSVP itself does not have a routing protocol. For this, an existing protocol is used in a routing (destination determining) process on data by a routing apparatus [namely, a so-called IP router or an ATM (Asynchronous Transfer Mode) switch or the like having a function equivalent to that of the IP router].

Namely, in terms of packet data for RSVP such as an RSVP message (request for securing a resource) or the like, the existing routing apparatus (routing method) determines the next packet transfer target (adjacent routing apparatus; route) on the basis of only an IP address given to the packet data, and performs a packet transferring process, like other ordinary packet data.

Since such the known routing apparatus (routing method) performs a routing on the basis of only an IP address, there is possibility of trying a routing for an RSVP message to an apparatus in which a bandwidth cannot be secured (or is hardly secured). A reason of this is that the present IP is designed for a dynamic, best effort apparatus (a network configured on the basis of a theory that guarantees a necessary bandwidth for a communication when there is a margin in the bandwidth, but does not guarantee when there is not a margin), and does not possess a function of considering a state of use of a resource (for example, an idle bandwidth in the case of bandwidth) in another apparatus that can be the next packet transfer target (adjacent routing apparatus).

For this, there is a possibility of frequently performing a routing to an apparatus in which a bandwidth requested by an RSVP message cannot be secured (or is hardly secured) in the above routing apparatus. In consequence, a resource (a rate of use of CPU or the like) in the network is wastefully consumed so that loss might be generated. As a result, there is a possibility of degrading serviceability such that a service (VOD service or the like) requested by the user cannot be provided.

SUMMARY OF THE INVENTION

In the light of the above problems, an object of the present invention is to provide a routing apparatus and a routing method, in which a routing process is performed in consideration of a state of use of a resource in the adjacent routing apparatus when a request for reserving a resource (communication resource) is received, whereby a wasteful routing is prevented at the time of resource reservation.

The present invention therefore provides a routing apparatus comprising a routing controlling unit for controlling transfer of a received packet data to an adjacent routing apparatus on a basis of destination information of the packet data, a first resource management unit for managing resource management information regarding communication resource in another routing apparatus that can be the adjacent routing apparatus, and a first determining unit for securing a communication resource upon receiving a packet data for a reservation request, and determining the adjacent routing apparatus on the basis of destination information given to the packet data and the resource management information.

The above first resource management unit may hold at least information in which routing information on another routing apparatus that can be the adjacent routing apparatus and use state information on the communication resource in the same are corresponded to each other as the resource management information. In such case, it is desirable that the above first determining unit is configured as a routing determining unit for reservation request for determining routing information for another routing apparatus in which a communication resource according to the packet data for a reservation request can be secured as routing information for the adjacent routing apparatus on the basis of the use state information, and the routing controlling unit controls the routing on the basis of the routing information determined by the reservation request routing determining unit.

The present invention also provides a routing method used in a communication network in which a plurality of routing apparatuses each handling packet data for a desired communication service comprising the steps of receiving a packet data for a communication resource reservation request; and carrying out a routing process for transferring the reservation request to a adjacent routing apparatus in consideration of at least a state of use of a communication resource in another routing apparatus that can be the adjacent routing apparatus.

According to the routing apparatus and the routing method of this invention, it is possible to perform a routing in consideration of at least a state of use of a communication resource in another routing apparatus that can be the adjacent routing apparatus when a reservation request for reserving use of a communication resource required to implement a desired communication service is received. It is therefore possible to largely decrease a possibility of performing a wasteful routing process to a routing apparatus in which a communication resource according to the above reservation request cannot be secured or is hardly secured, so that the communication resource is effectively used.

The above routing controlling unit may include a first resource management information creating/updating unit for creating or updating the resource management information on the basis of a record of securing a communication resource in another routing apparatus that was once the adjacent routing apparatus for past packet data for a reservation request.

It is thereby possible to automatically hold information on a recent state of use of a communication resource in another routing apparatus, thus easily grasp the recent state of use of a communication resource in the same.

The first resource management information creating/updating unit may comprise a first timer unit for measuring a first predetermined period from when the resource management information is created, a first information confirming unit for confirming whether or not resource management information held longer than the predetermined period exists in the first resource management unit on the basis of time-measuring information of the first timer unit, and a first information deleting unit for deleting resource management information in the first resource management unit when the first information confirming unit confirms that the resource management information held longer than the first predetermined period exists in the first resource management unit.

As above, the created resource management information is held for a predetermined period. When a similar reservation request is received within the predetermined period, a routing for the reservation request is performed on the basis of the created resource management information, so that a load of the routing is decreased, and a memory quantity required to hold information is decreased.

The above first resource management information creating/updating unit may comprise a first monitoring unit for monitoring whether or not a communication resource according to the packet data for a reservation request can be secured in the adjacent routing apparatus, a second information confirming unit for confirming whether or not resource management information corresponding to the adjacent routing apparatus exists in the first resource management unit when the first monitoring unit confirms that the communication resource cannot be secured in the adjacent routing apparatus, and a second information deleting unit for deleting the resource management information in the first resource management unit when the second information confirming unit confirms that the resource management information corresponding to the adjacent routing apparatus in which the communication resource cannot be secured exists.

When a communication resource according to the above reservation request cannot be secured in the adjacent routing apparatus, resource management information on that apparatus can be deleted. It is therefore possible to prevent an increase of a memory quantity because of holding unnecessary resource management information, and prevent an erroneous determination on the adjacent routing apparatus.

The present invention still also provides a routing apparatus comprising an interconnection controlling unit for controlling an interconnection to transfer a received packet data to an adjacent routing apparatus on the basis of destination information of the packet data, a second resource management unit for managing resource management information regarding a communication resource in another routing apparatus that can be the adjacent routing apparatus, and a second determining unit for securing a communication resource according to a reservation request upon receiving a packet data for the reservation request, and determining the adjacent routing apparatus on the basis of destination information given to the packet data and the resource management information.

The above second resource management unit may hold at least information in which interconnection information on another routing apparatus that can be the adjacent routing apparatus and use state information on a communication resource in the same are corresponded to each other as the resource management information. In such case, it is desirable that the above second determining unit is configured as a connection determining unit for reservation request for determining interconnection information for another routing apparatus in which a communication resource according to the packet data for a reservation request can be secured as interconnection information for the adjacent routing apparatus on the basis of the use state information, and the above interconnection controlling unit controls the interconnection on the basis of the interconnection information determined by the connection determining unit, for reservation request.

The routing apparatus according to this invention can control an interconnection for a reservation request in consideration of a state of use of a communication resource in another routing apparatus that can be the adjacent routing apparatus. It is therefore possible to ensure a sufficient service quality to a communication service strict with delay, and prevent a wasteful routing.

The above interconnection controlling unit may comprise an interconnection confirming unit for confirming whether or not the interconnection for the adjacent routing apparatus determined by the second determining unit is already secured, and an interconnection assigning unit for assigning the interconnection to a packet transferring process when the interconnection confirming unit confirms that the interconnection is already secured.

As above, when an interconnection for the adjacent routing apparatus is already secured, the interconnection already secured can be used in the packet transferring process. It is thereby possible to decrease a degree of necessity of securing a new interconnection each time a reservation request is received, thus largely contribute to a decrease a processing load of this routing apparatus.

The above interconnection controlling unit may comprise a second resource management information creating/updating unit for creating or updating the resource management information on the basis of a record of securing a communication resource in another routing apparatus that was once the adjacent routing apparatus for past packet data for a reservation request.

Accordingly, it is possible to create or update resource management information on another apparatus that was once the adjacent routing apparatus by a past reservation request on the basis of a record of securing a communication resource in the same. Therefore, information on a recent state of use of a communication resource in another routing apparatus can be automatically held, and a recent state of use of the communication resource in another routing apparatus can be readily grasped.

The above interconnection controlling unit may comprise a second timer unit for measuring a second predetermined period from when an interconnection for the packet data for a reservation request is established, an interconnection continuative securing unit for continuing securement of the interconnection until the second predetermined period is elapsed in the second timer unit, and an interconnection releasing unit for releasing the interconnection when the second predetermined period is elapsed in the second timer unit. In such case, the above second resource management information creating/updating unit may comprise a third information deleting unit for deleting created resource management information on the adjacent routing apparatus corresponding to the interconnection released by the interconnection releasing unit in the second resource management unit.

As above, an interconnection once secured is held for a predetermined period (second predetermined period). It is therefore possible to decrease necessity of securing an interconnection each time a reservation request is received, and it is unnecessary to continuously secure a wasteful interconnection. Accordingly, a load of the interconnection control can be further decreased, and the communication resource can be effectively used.

The above second resource management information creating/updating unit may comprise a second monitoring unit for monitoring whether or not a communication resource according to the packet data for a reservation request can be secured in the adjacent routing apparatus, a third information confirming unit for confirming whether or not resource management information on the adjacent routing apparatus exists in the second resource management unit when the second monitoring unit confirms that the communication resource cannot be secured in the adjacent routing apparatus, and a fourth information deleting unit for deleting the resource management information in the second resource management unit when the third information confirming unit confirms that the resource management information on the adjacent routing apparatus in which the communication resource cannot be secured exists in the second resource management unit.

When a communication resource according to the above reservation request cannot be secured in the adjacent routing apparatus, resource information on that routing apparatus can be deleted. It is therefore possible to prevent an increase of a memory quantity because of holding unnecessary resource management information, and an erroneous determination on the adjacent routing apparatus.

When the above communication resource is a bandwidth, it is possible to perform a routing process (or an interconnection control) in consideration of a state of use of a bandwidth in another routing apparatus. Accordingly, it is possible to largely lessen probability of performing a routing to an apparatus in which a bandwidth cannot be secured (or is hardly secured) in response to a reservation request, thus certainly prevent a wasteful routing (an interconnection control) from being performed.

BRIEF DESCRIPTION OF THE DRAWINGS

FIG. 7 is a diagram depicting a structure of a destination IP address-output VPI/VCI correspondence table according to the embodiment;

FIG. 8 is a diagram depicting a structure of an input VPI/VCI-output VPI/VCI correspondence table according to the embodiment;

FIG. 9 is a diagram depicting a structure of a bandwidth/interconnection information management table for RSVP according to the embodiment;

FIGS. 12A and 12B are diagrams for illustrating an example of updating information in the RSVP IP routing table;

DESCRIPTION OF THE PREFERRED EMBODIMENT

Hereinafter, description will be made of embodiments of this invention with reference to the drawings.

Figure 1:
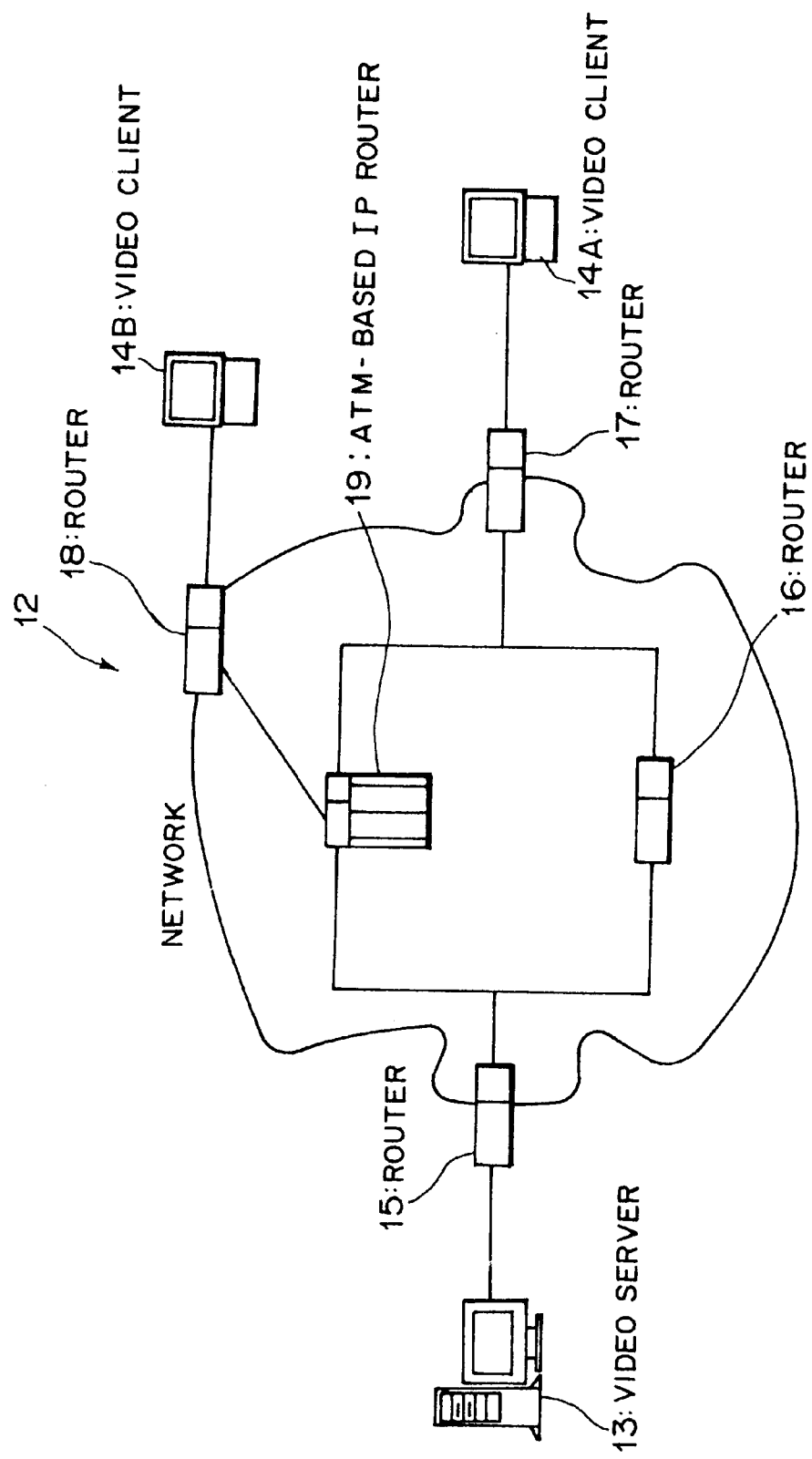
FIG. 1 is a block diagram showing a structure of the Internet (TCP/IP communication network) according to an embodiment of this invention.

FIG. 1 is a block diagram showing a structure of the Internet (TCP/IP communication network) according to an embodiment of this invention. The TCP/IP communication network 12 shown in FIG. 1 is configured with, for example, a video server 13 providing VOD service (video data) in response to a service request from each of video clients (terminals) 14A and 14B, IP routers. (routing apparatus) 15 through 18 each determining a transfer destination (route) of video data or a service request transmitted/received as IP packet data (hereinafter occasionally referred to merely as "packet") between the video server 13 and each of the video clients 14A and 14B, an ATM switch (ATM-based IP router) 19 having a routing function equivalent to those of the IP routers 15 through 18, and the like.

Figure 2:
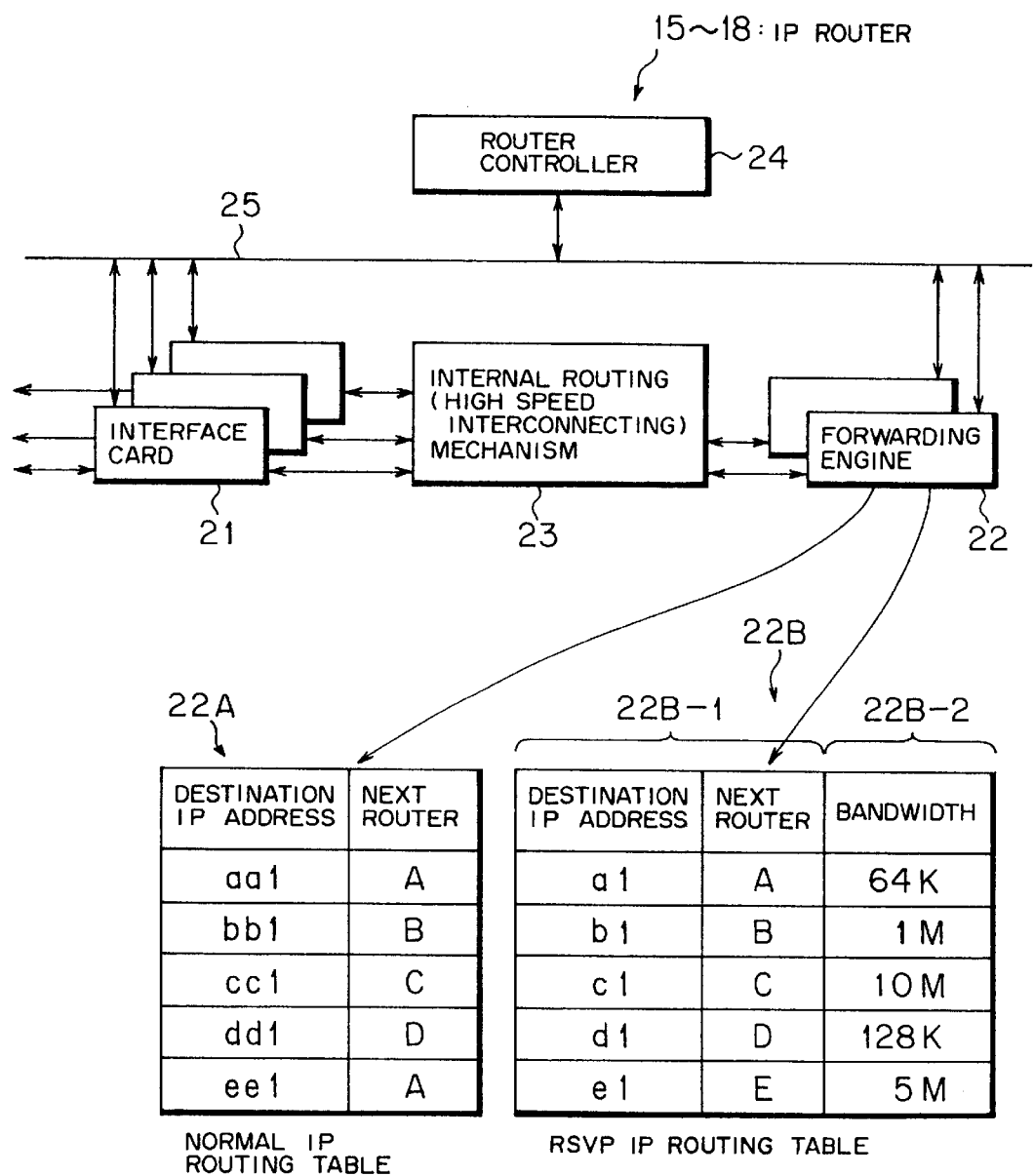
FIG. 2 is a block diagram showing an example of a hardware structure of an IP router (routing apparatus) according to the embodiment.

Each of the IP routers (hereinafter referred to merely as "routers") 15 through 18 other than the ATM-based IP router 19 comprises an interface card 21, a forwarding engine 22, an internal routing (high speed interconnecting) mechanism 23 and a router controller 24, as shown in FIG. 2, when focused on functions of essential parts thereof. The interface card 21 and the forwarding engine 22 are controlled by the router controller 24 through a common signal line (bus or the like).25. Incidentally, a structure of the ATM-based IP router 19 (hereinafter referred to merely as "ATM router 19") will be described later with reference to FIGS. 5 through 9, 10A and 10B.

The interface card 21 receives packet data to which at least a destination IP address (destination information) according to a destination (video client 14A, 14B or the like)

to be provided the VOD service, for example. The interface card 21 can also receive an RSVP message (packet data for a reservation request) for reserving use of a resource (here, bandwidth) required to carry out the above VOD service.

In the interface card (hereinafter referred to merely as "interface") 21, each received packet is sent to the internal routing mechanism 23, while a transmit packet having undergone an internal routing process (destination determination) from the internal routing mechanism 23 is sent toward a router that is an object of the next packet transfer through a relevant port (not shown). The number of the interfaces 21 is appropriately set according to the number of connections (routes).

Figure 3:
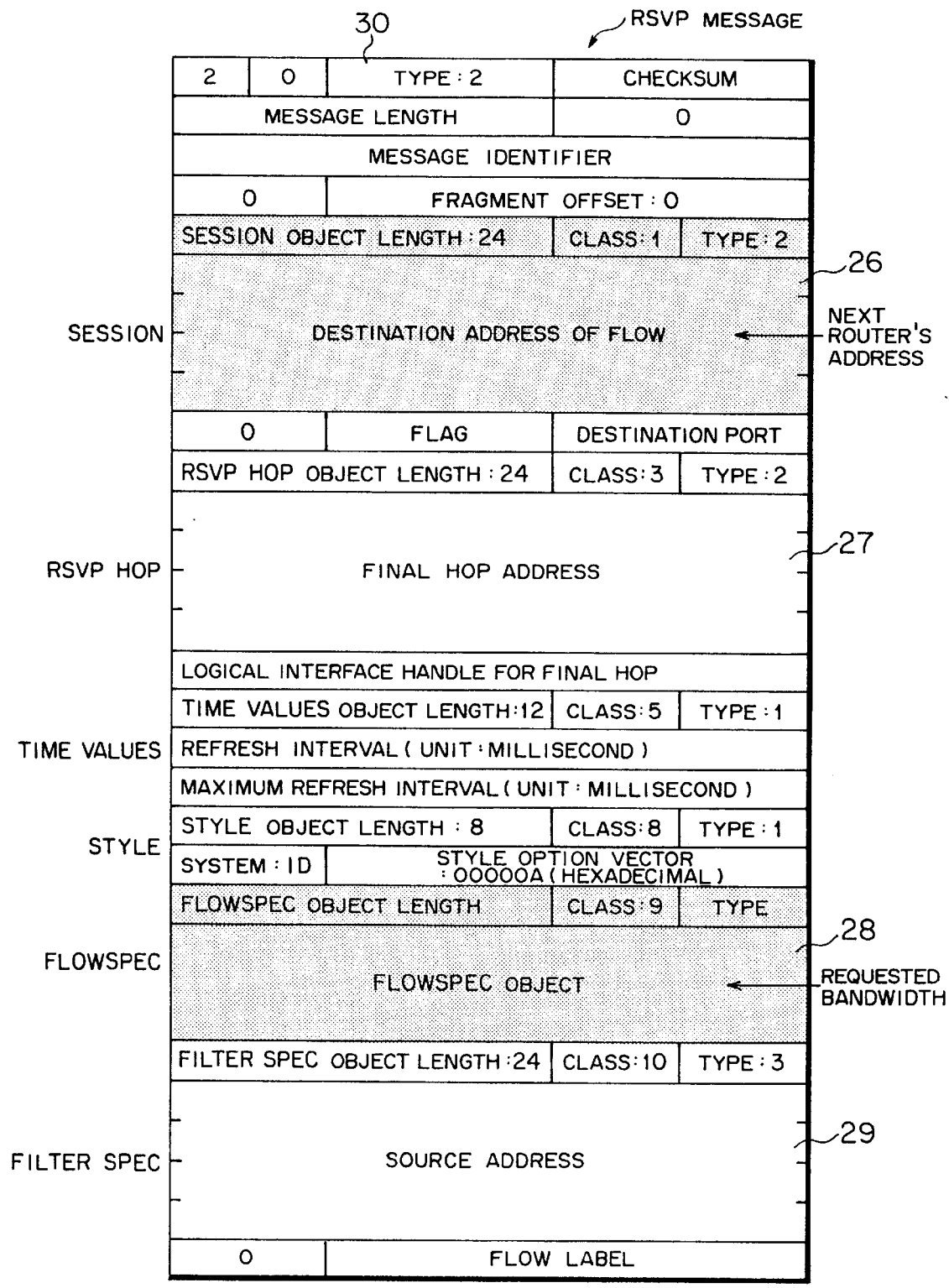
FIG. 3 is a diagram depicting an example of an RSVP message format according to the embodiment.

The above RSVP message (hereinafter referred to as "RSVP packet") has a format as shown in FIG. 3, for example. In FIG. 3, a destination address [next router address: IP address of a router that is a target of the next packet transfer (next hop destination) of a flow is set (given) in an information field 26, a final hop address [final hop destination address of the packet: IP address of, for example, the video client 14A or 14B] is set (given) in an information field 27, a requested bandwidth value is given in an information field 28, and a transmission source address (IP address of the video server 13, for example) is given in an information field 29.

Meanwhile, that itself is an RSVP packet is set and indicated in, for example, an information field 30. In concrete, an address of the next hop destination (next router's address) determined by the forwarding engine 22 to be described later is set in the above information field 26. Finally, the internal routing mechanism 23 performs a switching of an internal output route for an inputted packet according to the address set in the information field 26, whereby a self internal routing process (hereinafter referred to "self routing" or merely "routing") is performed on the received RSVP packet.

In the information fields 27 through 29, there are set an address, a bandwidth value and the like determined in the transmission source (for example, the video server 13). Note that the information set in these information fields 27 through 29 is not changed in the internal routing process in each of the routers 15 through 18 and the ATM router 19 between the transmission source and the final hop destination (for example, the video server 13 and the video client 14).

The internal routing mechanism 23 performs the internal routing process to transfer the packet (including RSVP packet) received by the interface 21 to a router that is the next hop destination. For example, the internal routing mechanism 23 refers to the next router's address determined and given by the forwarding engine 22 as described above, performs a self routing according to the address, and sends the received packet to a relevant port of the interface 21, thereby transferring the packet to the next hop destination (adjacent routing apparatus).

The forwarding engine (routing controlling unit) 22 controls a routing (the internal routing mechanism 23) in such a manner that the forwarding engine 22 retrieves in a normal IP routing table as shown in FIG. 2 on the basis of at least the destination IP address given to the packet (including RSVP packet) received by the interface 21 to determine a router that is to be the next hop destination so that the received packet is transferred to the determined next hop destination. Incidentally, the number of the forwarding engines 22 is appropriately set according to the number of the connection destinations (routes).

When the interface 21 receives the above RSVP packet, the forwarding engine 22 secures a bandwidth required by the RSVP packet for VOD service, and determines an address of the next router on the basis of a destination IP address given in the information field 27 of the RSVP packet and information in an RSVP IP routing table 22B as shown in FIG. 2.

The above normal IP routing table 22A is configured with information in which a destination IP address is corresponded to an address of the next router corresponding to the destination IP address. The RSVP IP routing table 22B is configured with information (resource management information) in which information (a destination IP address and an address of the next router: routing information 22B-1) similar to that of the normal IP routing table 22A is corresponded to information (idle bandwidth information) 22B-2 on an idle bandwidth quantity (state of use of the communication resource) in the next router. Therefore, the forwarding engine 23 can recognize an idle bandwidth quantity in a router that can be the next hop destination by referring to the information of the RSVP IP routing table 22B.

Figure 4:
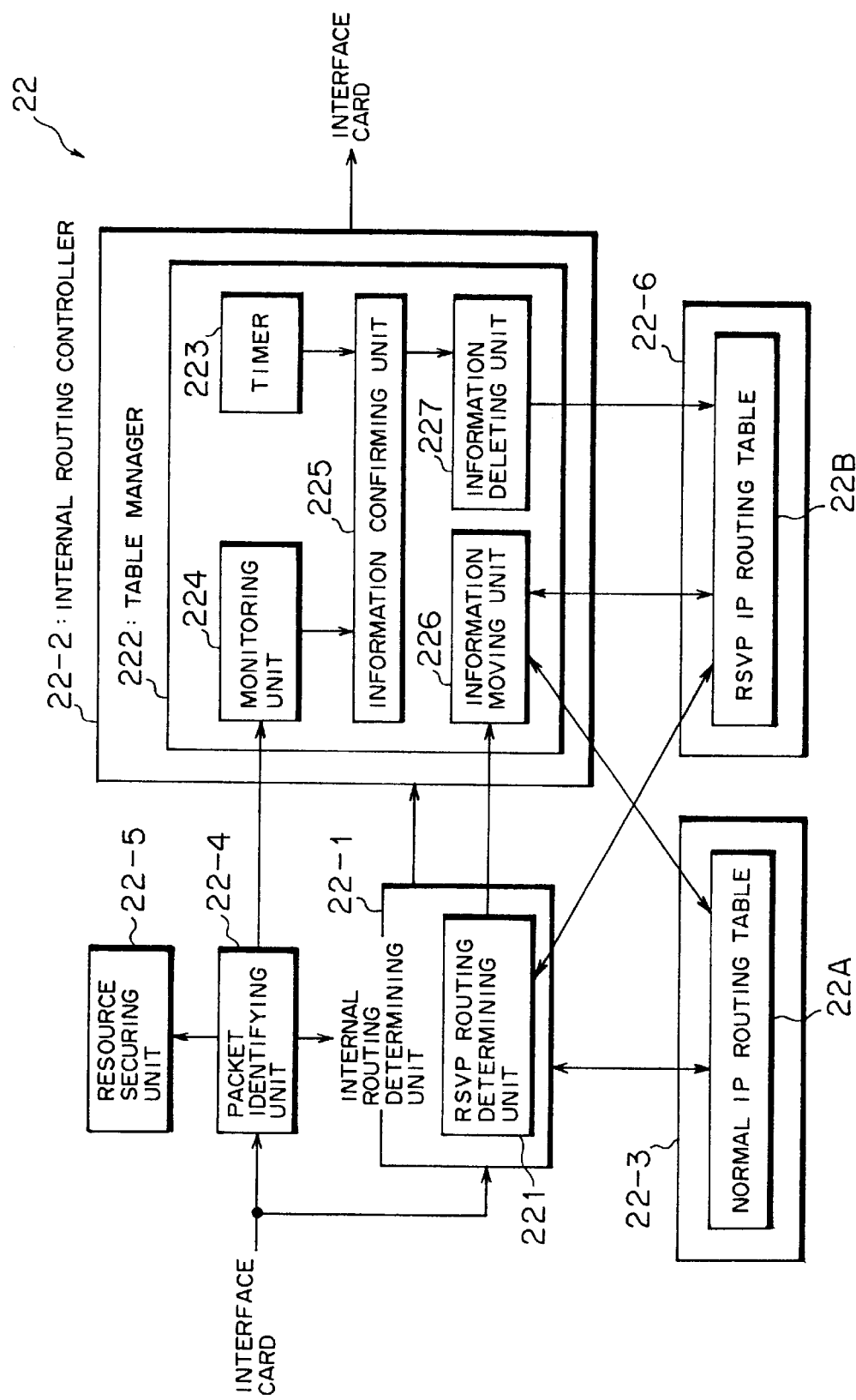
FIG. 4 is a block diagram showing an example of a structure of a forwarding engine in the IP router according to the embodiment.

In order to realize the above function, the forwarding engine 22 comprises, as shown in FIG. 4, for example, an internal routing determining unit 22-1, an internal routing controller 22-2, memories 22-3 and 22-6, a packet identifying unit 22-4 and a resource securing unit 22-5 when focused on a structure (software structure) of an essential part thereof. The units 22-1, 22-2, 22-4 and 22-5 other than the memories 22-3 and 22-6 are realized by carrying out predetermined software by a CPU or the like not shown, for example.

The above memory 22-3 holds the above normal IP routing table 22A, which is configured with a RAM or the like, for example. The internal routing determining unit 22-1 determines a router that is to be the next hop destination on the basis of at least a destination IP address given to a packet received by the interface 21. In concrete, the internal routing determining unit 22-1 retrieves in the normal IP routing table 22A held in the memory 22-3 on the basis of the destination IP address given to the received packet to determine (select) an address of the relevant next router as an address of a router that is to be the next hop destination.

The internal routing controller 22-2 gives the address of the next router determined by the routing determining unit 22-1 as an address of the next router for the received packet, thereby controlling a routing in the internal routing mechanism 23 such that the packet received by the interface 21 is transferred to a router that is the next hop destination.

The packet identifying unit 22-4 determines at least whether the packet received by the interface 21 is an RSVP packet or not by referring to the information field 30. When the packet identifying unit 22-4 determines that the received packet is an RSVP packet, the resource securing unit 22-5 secures a bandwidth requested by the. RSVP packet for VOD service. Here, the resource securing unit 22-5 can confirm whether or not the requested bandwidth can be secured, and send back a result of the confirmation (OK/NG information) to a transfer source (the preceding router) of the RSVP packet, when securing the bandwidth.

The memory 22-6 holds the above RSVP IP routing table 22B, which is configured with a memory for temporary storage such as a cache memory or the like. The memory 22-6 functions as a first resource management unit for holding resource management information for managing a state of use of a bandwidth in a router that can be the next hop destination by holding the RSVP IP routing table 22B.

The above internal routing determining unit 22-1 comprises an RSVP routing determining unit (reservation request) (first determining unit) 221 determining a router that is to be the next hop destination on the basis of a destination IP address given in the information field 27 of the RSVP packet and information in the RSVP IP routing table 22B in the memory 22-6 when the above packet identifying unit 22-4 determines that the received packet is an RSVP packet.

In concrete, the RSVP routing determining unit 221 retrieves in, for example, the RSVP IP routing table 22B, and determines (selects) an address of the next router having idle bandwidth information 22B-2 greater than a bandwidth requested by the received RSVP packet (when there are a plurality of addresses of the next routers satisfying the requested bandwidth, an address of the next router having the maximum idle band information 22B-2) as a next router's address that should be given to the received RSVP packet.

When an RSVP packet is received, the RSVP routing determining unit 221 determines a router that is to be the next hop destination (next router's address) in consideration of an idle bandwidth quantity of a router that can be the next hop destination, and the internal routing controller 22-2 gives the next router's address determined by the RSVP routing determining unit 221 to the received RSVP packet, thereby controlling a routing in the internal routing mechanism 23.

When a next router's address (routing information 22B-1) satisfying the bandwidth requested by the received RSVP packet does not exist in the RSVP IP routing table 22B, the internal routing determining unit 22-1 determines the next hop destination for the received RSVP packet on the basis of the normal IP routing table 22A (only the destination IP address).

The above tables 22A and 22B are managed by a table manager 222 in the internal routing controller 22-2. According to this embodiment, the table manager 222 moves a next router's address (routing information 22B-1) determined by the RSVP routing determining unit 221 into the normal IP routing table 22A, creates/updates information in the table 22B, etc.

In concrete, the table manager 222 functions as a first information creating/updating unit creating or updating information (resource management information) in the memory 22-6 (RSVP IP routing table 22B) on the basis of a record of securing a bandwidth in a router that was once the next hop destination for the past RSVP packet (detailed procedure will be described later). The table manager 222 comprises, as shown in FIG. 4, for example, a timer 223, a monitoring unit 224, an information confirming unit 225, an information moving unit 226 and information deleting unit 227.

The timer (first timer unit) 223 measures a predetermined period (first predetermined period: several minutes to several tens of minutes, for example) from when resource management information is created in the above table 22B. The monitoring unit 224 monitors by means of the packet identifying unit 22-4 a reply of OK/NG information about whether a bandwidth can be secured or not from the next router, thereby monitoring whether or not the bandwidth requested by the RSVP packet can be secured in a router that is to be the next hop destination.

The information confirming unit (first, second information confirming unit) 225 confirms whether or not resource management information held longer than the above predetermined period (timed-out) exists in the memory 22-6 (table 22B) on the basis of a result of the time-measuring by the above timer 223. When the above monitoring unit 224 confirms that the requested bandwidth cannot be secured in the router that is to be the next hop destination, the information confirming unit 225 confirms whether or not resource management information corresponding to that router exists in the memory 22-6 (table 22B).

When the information confirming unit 225 confirms that resource management information timed-out exists in the table 22B, or that resource management information corresponding to a router that cannot secure the requested bandwidth exists in the table 22B, the information deleting unit (first, second information deleting unit) 227 deletes that resource management information in the table 22B.

Namely, resource management information in the table 22B is held for the above predetermined period (first predetermined period). When a similar new RSVP packet is received within the predetermined period, a determination (routing) on the next hop destination for the new RSVP packet is made on the basis of the created resource management information. Accordingly, a load of the routing process is decreased, and a quantity of the memory required to hold information is decreased.

The information transferring unit 226 moves (additionally enters) a next router's address (routing information 22B-1) determined by the RSVP routing determining unit 221 from the RSVP IP routing table 22B to the normal IP routing table 22A, whereby a normal routing process based on the normal IP routing table 22A is performed on an IP packet thereafter (packet relating to the VOD service having made a reservation request) having the same destination IP address as the RSVP packet.

Namely, the RSVP IP routing table 22B is used only for determining the next hop destination when an RSVP packet is received, whereas the normal IP routing table 22A is always used for a routing on a packet other than that.

Figure 5:
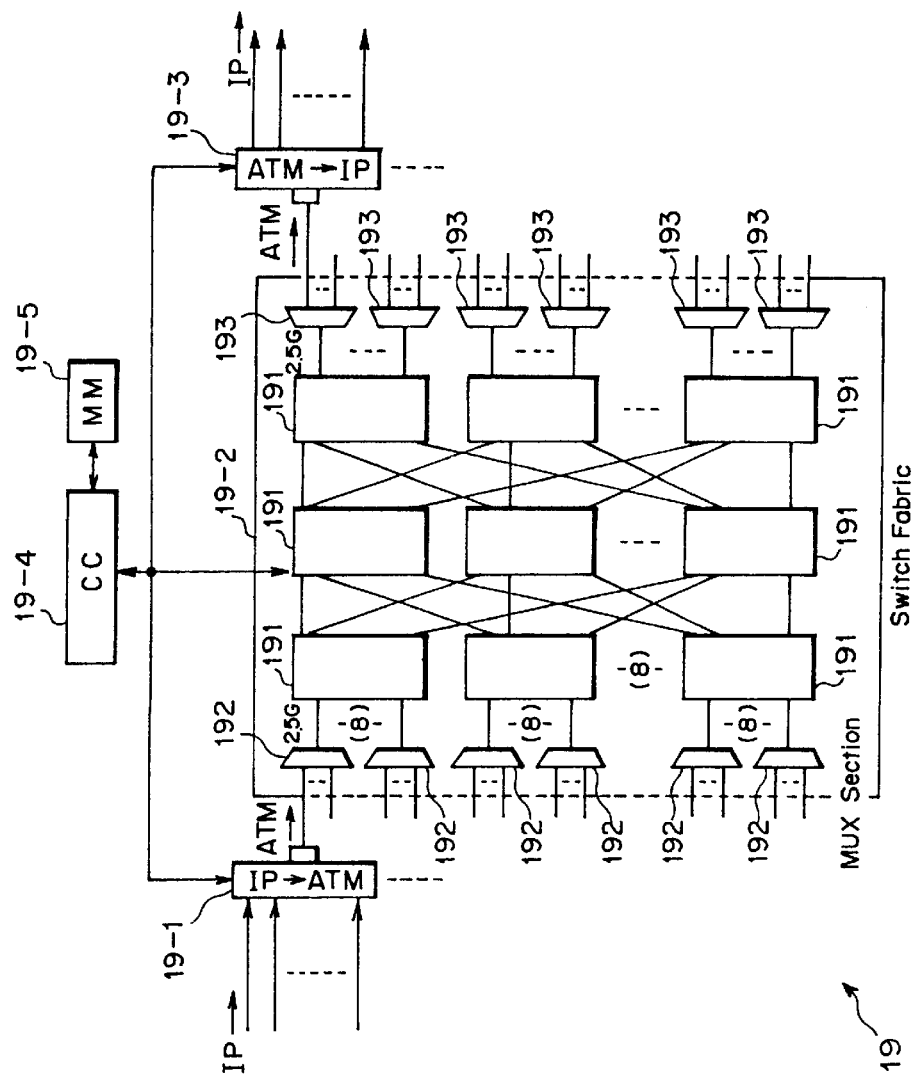
FIG. 5 is a block diagram showing an example of a hardware structure of an ATM-based IP router (routing apparatus) according to the embodiment.

Next, a detailed structure of the ATM router 19 shown in FIG. 1 will be described. As shown in FIG. 5, the ATM router 19 according to this embodiment comprises, from the viewpoint of hardware, an IP/ATM converting module 19-1, an ATM switch fabric 19-2, an ATM/IP converting module 19-3, a central controller 19-4 and a main memory 19-5, for example.

The IP/ATM converting module 19-1 receives a packet given at least a destination IP address corresponding to a destination to which the VOD service is furnished (video client 14A or 14B), converts the packet into an ATM cell having internal transfer information [VPI (Virtual Path Identifier)/VCI (Virtual Channel Identifier)] corresponding to the destination IP address in the header (5 bytes), and outputs it to the ATM switch fabric 19-2. Conversely, the ATM/IP converting module 19-3 converts the format of the ATM cell outputted from the ATM switch fabric 19-2 into a format of a packet having the original destination IP address.

As shown in FIG. 5, the ATM switch fabric 19-2 is configured with a plurality of ATM switch circuits 191 interconnected in a multistage link structure. The ATM switch fabric 19-2 performs a self switching according to a VPI/VCI of an inputted ATM cell according to a setting (control) of an interconnection (input-output VPI/VCI) from the central controller 19-4 so as to ensure (establish) an interconnection according to the VPI/VCI of the inputted ATM cell.

Namely, the ATM switch fabric 19-2 ensures an interconnection according to a VPI/VCI of an ATM cell from the IP/ATM converting module 19-2 under a control of the central controller 19-4, thereby carrying out a routing equivalent to a routing in each of the routers 15 through 18.

To the ATM switch circuit 191 and a multiplexing section 192, there is provided an appropriate buffer memory not shown in order to adjust the number of cells to be switched (the number of ATM cells passing through the ATM switch fabric 19-1) according, to a quantity of secured bandwidth [UBR (Unspecified Bit Rate)/CBR (Constant Bit Rate)] to be described later. The number of each of the converting modules 19-1 and 19-3 corresponds to the number of signal lines accommodated by the multiplexing section 192 and a demultiplexing section 193, although not shown in FIG. 5.

The central controller 19-4 accesses to the main memory 19-5 as needed to collectively control operations of the ATM switch fabric 19-2, and the converting modules 19-1 and 19-3, which is capable of performing various controls and management such as protocol control, call/interconnection control, speech path control, resource management, subscriber data management, accounting/traffic management, fault management and the like.

The main memory 19-5 stores software and various data (for example, subscriber data, accounting data, traffic data, resource management data, history data relating to call control and the like).

The above central controller 19-4 can determine a router (or a terminal) that is to be the next hop destination on the basis of at least a destination IP address given to an IP packet received by the IP/ATM converting module 19-1, and perform a control (control on an interconnection) on the ATM switch fabric 19-2 such that the received packet is transferred to that router. In concrete, an interconnection is controlled (established) in the following manner, for example.

(1) On the basis of a destination IP address given to a received packet, referring to a destination IP address-output VPI/VCI correspondence table 22C as shown in FIG. 7 to obtain an output VPI/VCI corresponding to the destination IP address of the received IP packet.

(2) On the basis of the obtained output VPI/VCI, referring to an input VPI/VCI-output VPI/VCI correspondence table 22D as shown in FIG. 8 to obtain a corresponding input VPI/VCI.

(3) Outputting the obtained input VPI/VCI as a VPI/VCI that should be given to the header of an ATM cell when the IP packet is converted into an ATM cell to the IP/ATM converting module 19-1.

The above input VPI/VCI is given to the header of an ATM cell when the received IP packet is converted into an ATM cell in the IP/ATM converting module 19-1, the ATM cell is self-switched in each of the ATM switch circuits 191 of the ATM switch fabric 19-2, and the ATM cell is finally outputted to a port corresponding to the output VPI/VCI obtained as above from the table 22D. Namely, an input VPI/VCI for the received IP packet is corresponded to an output VPI/VCI of the same, whereby an interconnection is established.

Note that when an RSVP packet is received by the IP/ATM converting module 19-1, the ATM router 19 ensures a bandwidth requested by the RSVP packet for the VOD service, and determines an interconnection for the next router on the basis of a destination IP address given in the information field 27 of the RSVP packet and information of a bandwidth/interconnection information management table for RSVP 22E as shown in FIG. 9 according to this embodiment, like the other routers 15 through 18.

According to this embodiment, the bandwidth/interconnection information management table for RSVP 22E holds at least information in which interconnection information 22E-1 on another router that can be the next hop destination is corresponded to use state (idle bandwidth) information 22E-2 on a bandwidth in that router as resource management information, as shown in FIG. 9. The tables 22C through 22E are held in the main memory 19-5 as shown in FIG. 6.

Namely, the main memory 19-5 according to this embodiment holds the above bandwidth/interconnection information table for RSVP 22E, thereby functioning also as a second resource management unit holding resource management information for managing a state of use of a bandwidth in a router that can be the next hop destination.

Figure 6:
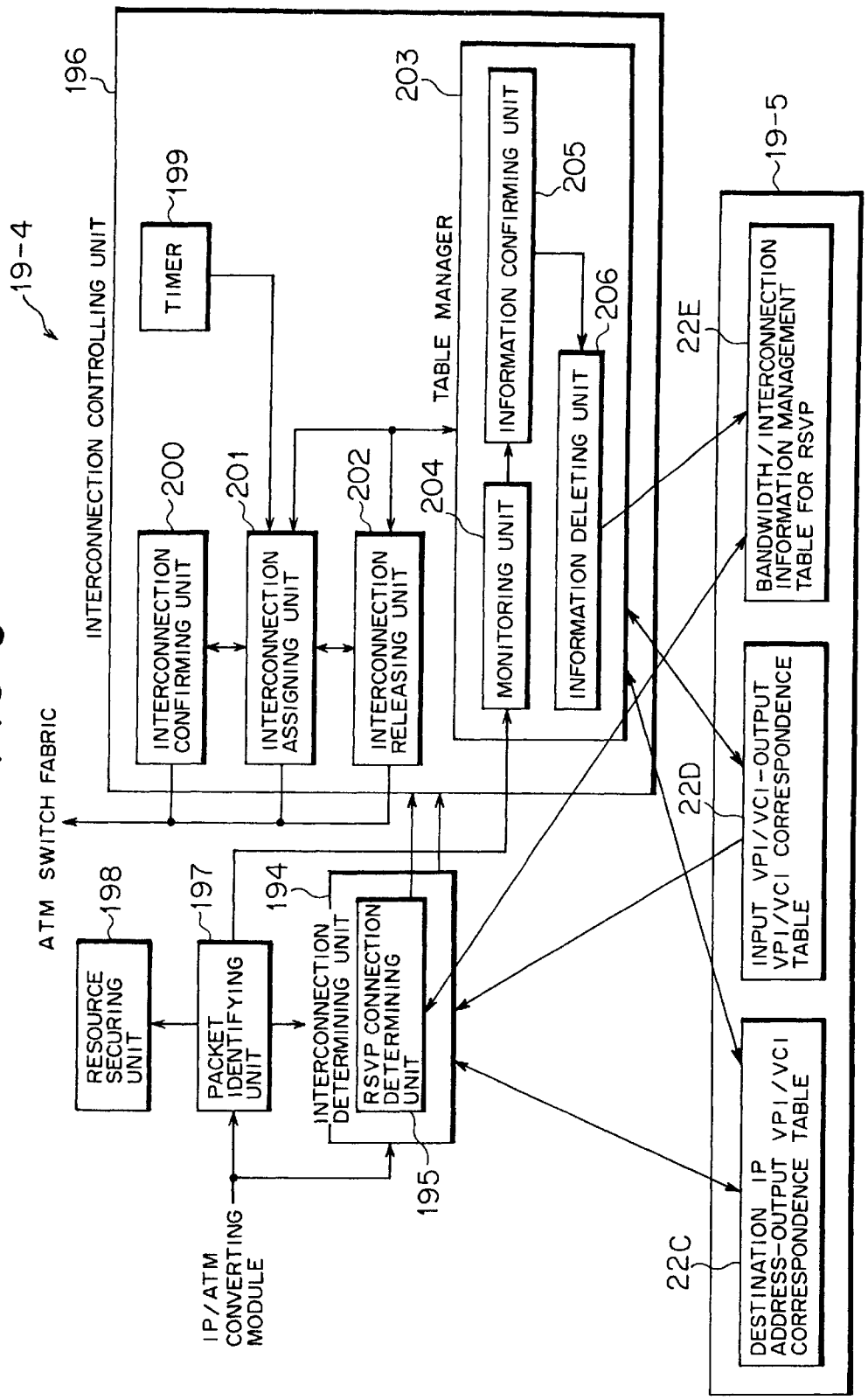
FIG. 6 is a block diagram showing an example of a structure of a central controller in the ATM-based IP router according to the embodiment.

In order to realize the above function, the central controller 19-4 according to this embodiment comprises, as shown in FIG. 6, an interconnection determining unit 194, an interconnection controlling unit 196, a packet identifying unit 197 and a resource securing unit 198 when focused on a function (software structure) of an essential part thereof. The above units 194 and 196 through 198 are as well realized by carrying out predetermined software by a CPU or the like not shown, for example.

The interconnection determining unit 194 determines a router that is to be the next hop destination as described above on the basis of at least a destination IP address given to a packet received by the IP/ATM converting module 19-1. The interconnection controlling unit 196 controls (controls an interconnection) the ATM switch fabric 19-2 such that the received packet is transferred to a router that is the next hop destination determined by the interconnection determining unit 194.

The packet identifying unit 197 determines at least whether or not the packet received by the IP/ATM converting module 19-1 is an RSVP packet. The resource securing unit 198 secures a bandwidth requested by the above received RSVP packet from an idle bandwidth for ATM communication, and assigns it to for the VOD service. For example, the resource securing unit 198 performs a setting of buffer control on the ATM switch circuits 191 and the multiplexing sections 192 (i.e., preferentially switches an ATM cell having a certain VPI/VCI) to secure and assign a necessary bandwidth for the secured interconnection.

Figures 10A, 10B:
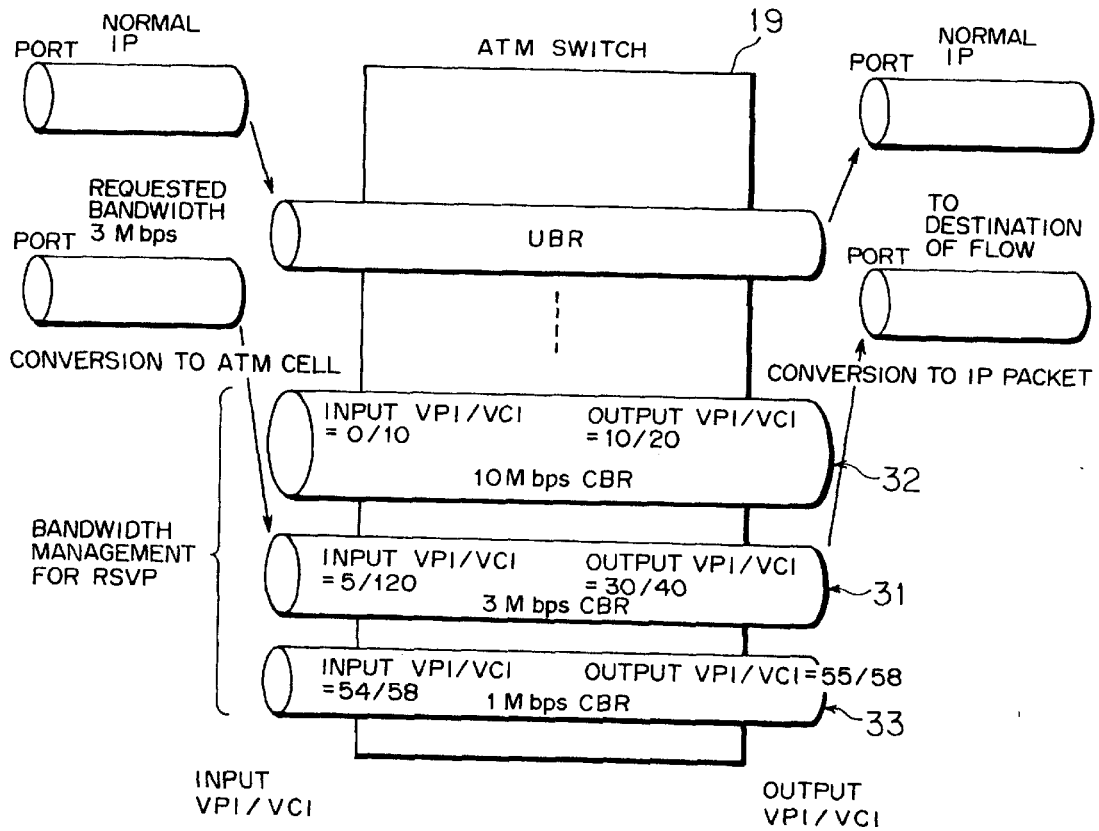
FIG. 10A is a diagram schematically depicting an example of securing interconnections/bandwidths when requests for bandwidths of 10 Mbps, 3 Mbps and 1 Mbps are made by RSVP packets according to the embodiment.
FIG. 10B is a diagram depicting an example of a structure of a bandwidth/interconnection management table for RSVP when the interconnections/bandwidths are secured as shown in FIG. 10A.

FIG. 10A schematically depicts an example of securing interconnections/bandwidths when RSVP packets request bandwidths of 10 Mbps, 3 Mbps and 1 Mbps. FIG. 10B depicts an example of the structure of the bandwidth/interconnection management table for RSVP 22E at the time of securing the interconnections/bandwidths shown in FIG. 10A.

As shown in FIGS. 10A and 10B, a bandwidth (CBR) in a range not exceeding a total bandwidth capacity handled by itself (ATM router 19) is assigned to the-interconnections secured for the RSVP packets, while UBR is automatically assigned to an interconnection secured for normal IP packets. When the bandwidth capacity of the ATM router 19 is decreased, a necessary bandwidth is not guaranteed to the IP packet assigned UBR as above. Namely, the degree of bandwidth guarantee (QoS) to the IP packet assigned UBR is lowered than that to the IP packet assigned CBR by reception of an RSVP packet.

The above interconnection determining unit 194 comprises an RSVP connection determining unit (reservation request) (second determining unit) 195 determining a router that is to be the next hop destination (interconnection information 22E-1) on the basis of a destination IP address given to the RSVP packet and information in the bandwidth/interconnection information management table for RSVP 22E (hereinafter occasionally referred to as "bandwidth management table for RSVP 22E") held in the main memory 19-5 when the above packet identifying unit 197 determines that the received packet is an RSVP packet.

In concrete, the RSVP connection determining unit 195 makes a determination in the following procedure, for example.

(1) On the basis of a destination IP address (final hop address) given in the information field 27 (refer to FIG. 3) of a received RSVP packet, referring to the destination IP address-output VPI/VCI correspondence table 22C to obtain a relevant output VPI/VCI.

(2) On the basis of the obtained output VPI/VCI, retrieving in the bandwidth/management table for RSVP 22E, and when interconnection information 22E-1 having idle bandwidth information 22E-2 greater than a requested bandwidth value exists therein, determining (selecting) that interconnection information 22E-1 (when plural pieces of adaptive information exist, determining interconnection information 22E-1 having the maximum idle bandwidth information 22E-2) as interconnection information for the received RSVP packet.

As above, when an RSVP packet is received, the RSVP connection determining unit 195 determines a router (interconnection information 22E-1) that is to be the next hop destination in consideration of an idle bandwidth quantity in a router that can be the next hop destination, and the interconnection controlling unit 196 secures an interconnection for the received RSVP packet on the basis of the interconnection information 22E-1 determined by the RSVP connection determining unit 195.

The interconnection controlling unit 196 comprises, as shown in FIG. 6, for example, a timer 199, an interconnection confirming unit 200, an interconnection assigning unit 201, an interconnection releasing unit 202 and a table manager 203.

The interconnection confirming unit 200 confirms whether or not the interconnection for the router that is to be the next hop destination determined by the RSVP connection determining unit 195 is secured in the ATM switch fabric 19-2. When the interconnection confirming unit 200 confirms that the above interconnection for the router that is to be the next hop destination is secured, the interconnection assigning unit 201 assigns the interconnection to a routing (transfer) for the RSVP packet.

The timer (second timer unit) 199 measures a predetermined period (second predetermined period: for example, several minutes to several tens of minutes) from when the interconnection for the RSVP packet is secured in the ATM switch fabric 19-2. The interconnection assigning unit 201 continues to secure the above interconnection until the above predetermined period is elapsed (timed out) in the timer 199. Namely, the interconnection assigning unit 201 also functions as an interconnection continuative securing unit.

The interconnection releasing unit 202 releases the above interconnection when the above timer 199 becomes time-out. The table manager 203 functions as a second resource management information creating/updating unit creating or updating resource management information for the table 22E in the main memory 19-5 on the basis of a record of a securing bandwidth in a router that was once the next hop destination for a past RSVP packet, which comprises a monitoring unit 204, an information confirming unit 205 and an information deleting unit 206, for example.

The monitoring unit (second monitoring unit) 204 monitors a reply of OK/NG information about whether the bandwidth can be secured or not from the next router, thereby monitoring whether the bandwidth corresponding to the RSVP packet can be secured in the router that is the next hop destination. When the monitoring unit 204 confirms that the requested bandwidth cannot be secured in the next router, the information confirming unit (third information confirming unit) 205 confirms whether or not resource management information corresponding to that router exists in the main memory 19-5 (table 22E).

When the information confirming unit 205 confirms that the resource management information corresponding to the next router that cannot secure the requested bandwidth exists in the table 22E, the information deleting unit (fourth information deleting unit) 206 deletes the information in the table 22E. The information deleting unit 206 also functions as a third information deleting unit deleting resource management information created in terms of the next router corresponding to an interconnection released by the above interconnection releasing unit 202 in the table 22E.

Namely, resource management information in the table 22E is held for a predetermined period (second predetermined period) from when a relevant interconnection is secured (established) to when the interconnection is released, and information held longer than the predetermined period, that is, information corresponding to a released interconnection is automatically deleted by the information deleting unit 206. Accordingly, that information exists in the table 22E means that an interconnection having been secured exists.

In other words, an interconnection whose information exists in the bandwidth management table for RSVP 22E is an interconnection not used at present (not in communication). According to this embodiment, the interconnection assigning unit 201 functioning as the interconnection continuation securing unit keeps holding an interconnection for an RSVP packet once secured even when the interconnection gets into a non-communication state so long as a sum of a bandwidth of a normal interconnection and a bandwidth requested by the RSVP packet does not exceed a total bandwidth capacity of the ATM router 19, since a processing load is increased if a new connection is secured each time an RSVP packet is received.

When a sum of a bandwidth of the normal interconnection and a bandwidth requested by the RSVP packet exceeds a total bandwidth capacity of the ATM router 19, the interconnection releasing unit 202 release a part or all of interconnections for RSVP, and switches it to for the normal interconnection. Under such control, when a similar bandwidth request is received, an interconnection is established only by switching relevant port and interconnection.

Figure 11:
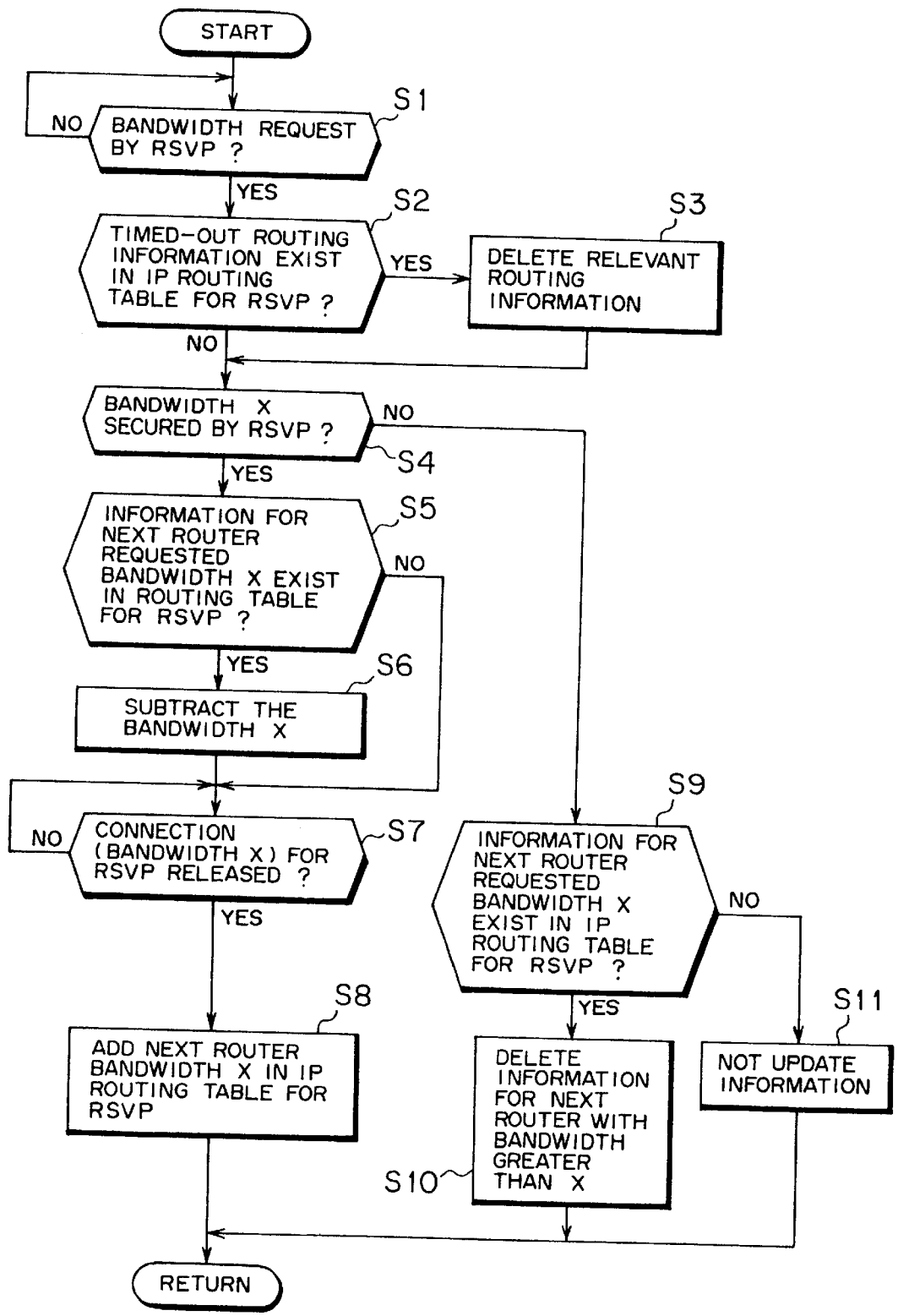
FIG. 11 is a flowchart for illustrating a procedure for creating an RSVP IP routing table (bandwidth/interconnection management table for RSVP) according to the embodiment.

Next, a procedure for creating and updating the RSVP IP routing table 22B in each of the above routers 15 through 18 (the bandwidth management table 22E in the ATM router 19) will be described. The table 22B (22E) is created/updated by that the table manager 222 (203) operates according to a flowchart (Steps S1 through S11) shown in FIG. 11.

Namely, the table manager 222 (203) monitors whether or not a bandwidth request by an RSVP packet is received (whether or not a packet received by the packet identifying unit 197 is determined as an RSVP packet) (NO route at Step S1). When a bandwidth request (for example, a request for a bandwidth X) by an RSVP packet is received (when judged YES at Step S1), the information confirming unit 225 (205) refers to the table 22B (22E) to check whether or not information timed-out exists therein (Step S2).

When no information timed-out exists [including an initial state in which no information is entered in the table 22B (22E)], the monitoring unit 224 (204) monitors whether or not the requested bandwidth X is secured in the next router by transferring the RSVP packet to that router (whether or not OK information is send back from the next router) (from NO route at Step S2 to Step S4).

When information timed-out exists, the information deleting unit 227 (206) deletes the information because the information is out-of-date (with a low reliability), the monitoring unit 224 (204) then monitors whether or not the requested bandwidth X is secured in the next router (from YES route at Step S2 to Steps S3 and S4).

When the requested bandwidth X is secured in the next router (when OK information is send back from the next router) (when judged YES at Step S4), the table manager 222 (203) refers to the table 22B (22E) to check whether or not information 22B-1 (22E-1) and 22B-2 (22E-2) on the next router exists therein (Step S5).

When the information 22B-1 (22E-1) and 22B-2 (22E-2) on the next router in which the bandwidth X is secured exists in the table 22B (22E), as a result, the table manager 222 (203) subtracts the bandwidth X from the idle bandwidth information 22B-2 (22E-2) to update the information (from YES route at Step S5 to Step S6).

If there is a request for a bandwidth of 4 Mbps by an RSVP packet and the bandwidth can be secured in the next router (destination IP address=c1) when the table 22B is in a state as shown in FIG. 12A, the table manager 222 updates the idle bandwidth information 22B-2 (10 Mbps) in a relevant item (number 3: refer to a shaded portion) to 6 Mbps (=10 Mbps–4 Mbps), as shown in FIG. 12B.

The table manager 222 (203) then monitors whether or not a session (interconnection) by the received RSVP packet is released (whether or not the VOD service is completed) (NO route at Step S7). When the session is released, the table manager 222 (203) enters routing information 22B-1 (22E-1) on the above next router and the idle bandwidth information 22B-2 (22E-2)=bandwidth X in the table 22B (22E) (from YES route at Step S7 to Step S8).

When the information 22B-1 (22E-1) and 22B-2 (22E-2) on the next router in which the bandwidth X is secured does not exist in the table 22B (22E), the table manager 222 (203) does not update the information at the above Step S6, but monitors whether or not the session by the received RSVP packet is released (from NO route at Step S5 to Step S7).

When the requested bandwidth X cannot be secured in the next router at the above Step S4 (when NG information is sent back from the next router so that securement of the bandwidth is denied), the information confirming unit 225 (205) refers to the table 22B (22E) to check whether or not idle bandwidth information 22B-2 (22E-2) on the next router greater than the bandwidth X exists therein (from NO route at Step S4 to Step S9).

When any idle bandwidth information 22B-2 (22E-2) greater than the bandwidth X exists as a result, it means that the information 22B-2 (22E-2) is out-of-date, thus unreliable. The information deleting unit 227 (206) therefore deletes the information 22B-2 (22E-2) and corresponding routing information 22B-1 (interconnection information 22E-1) in the table 22B (22E) (from YES route at Step S9 to Step S10).

When idle bandwidth information 22B-2 (22E-2) greater than the bandwidth X does not exist at Step S9, the table manager 222 (203) does not update the information in the table 22B (22E) (from NO route at Step S9 to Step S11).

As above, the table manager 222 (203) learns a record of securing a bandwidth in an adjacent router that was once the next hop destination for a past RSVP packet in the past, and automatically creates and updates the table 22B (22E) on the basis of the record.

Figure 13:
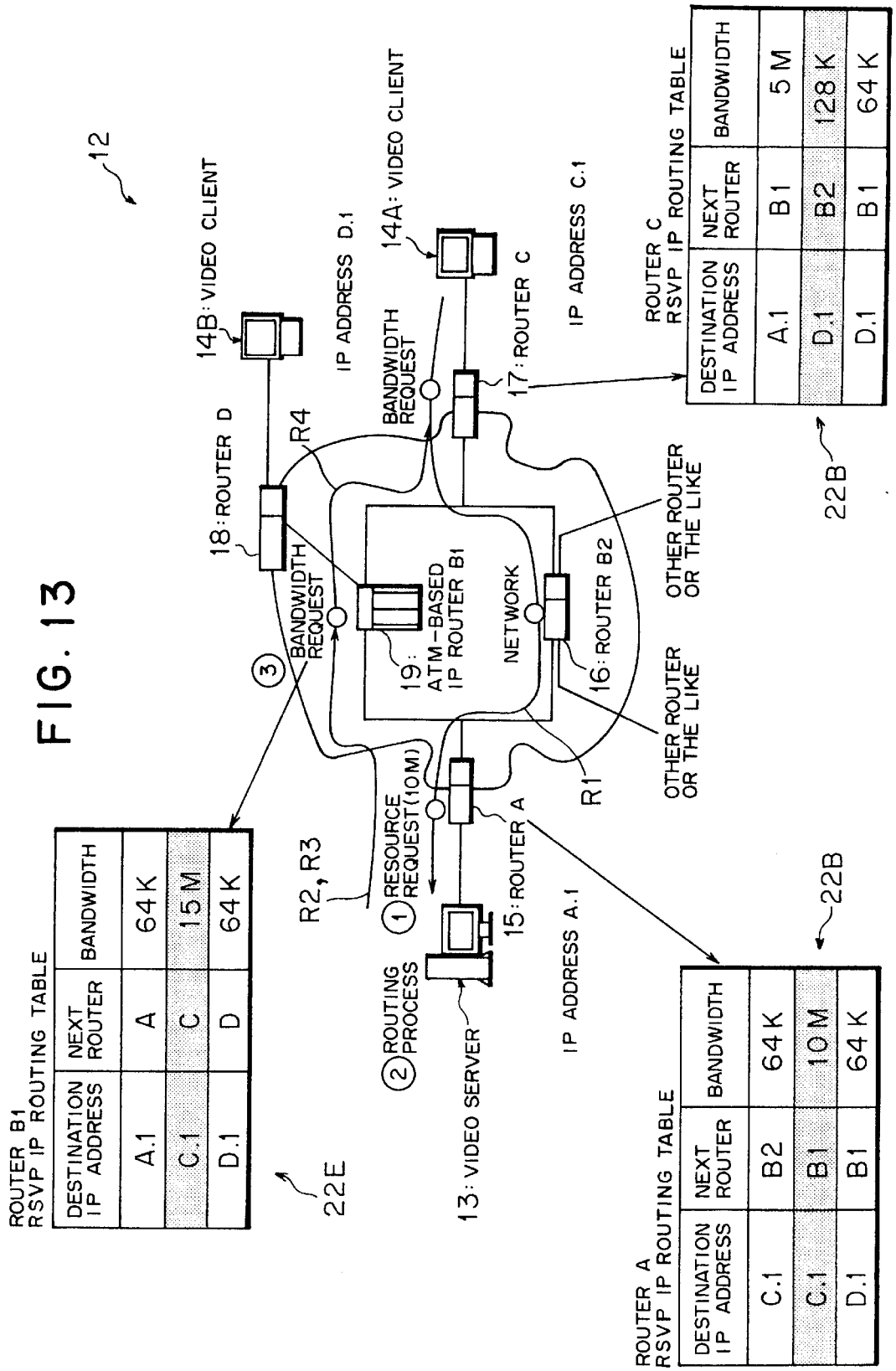
FIG. 13 is a diagram for illustrating a procedure for securing a bandwidth by an RSVP packet in the TCP/IP communication network according to the embodiment.
Figure 14:
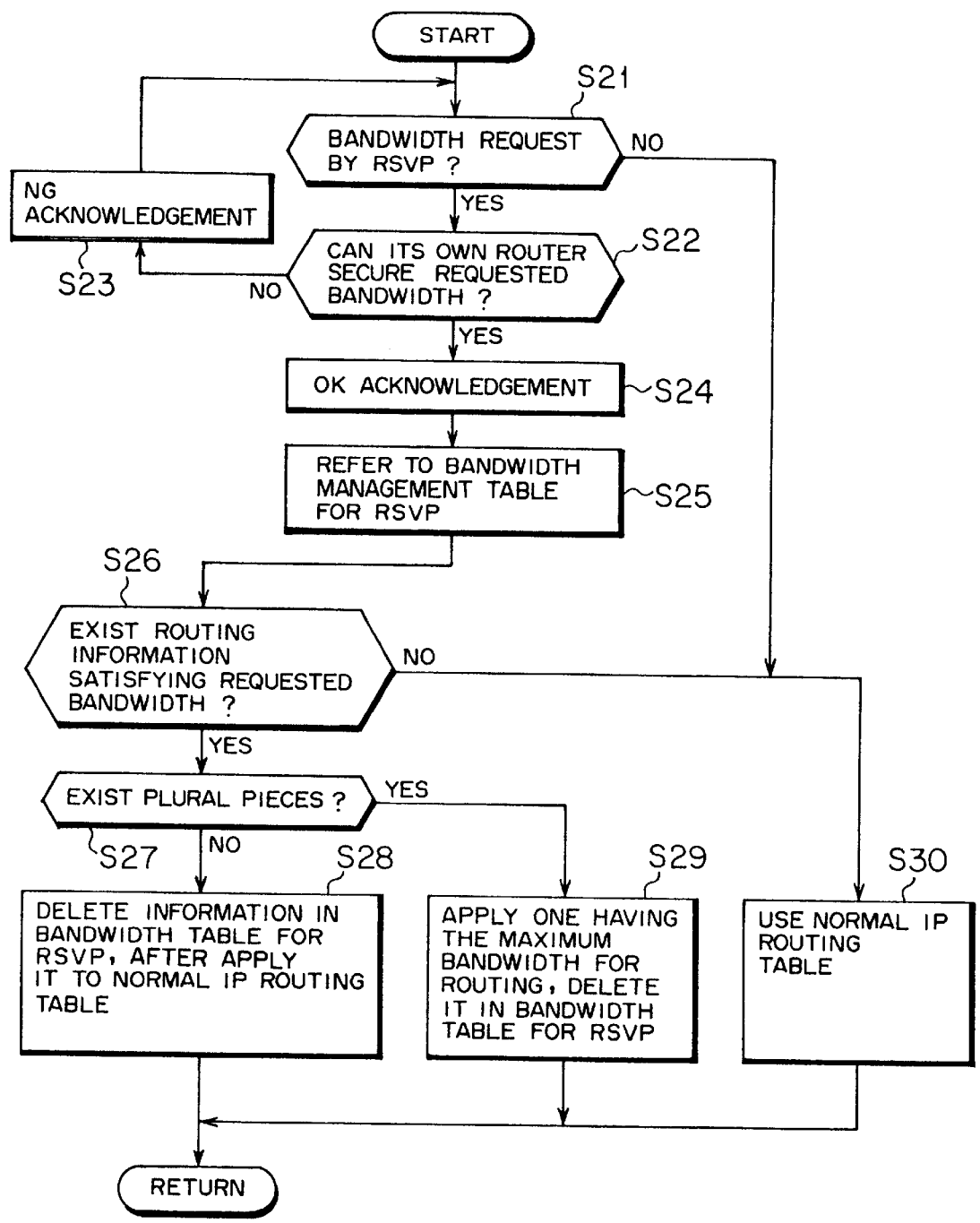
FIG. 14 is a flowchart for illustrating a procedure for determining the next router in the IP router according to the embodiment.

Hereinafter, a routing operation in the TCP/IP communication network 12 with the above structure according to this embodiment will be described with reference to FIGS. 13 through 15. In FIG. 13, an IP address of the video server 13 is "A.1", IP addresses of the video clients 14A and 14B are "C.1" and D.1", respectively, and IP addresses of the routers 15 through 19 are "A", "B2", "C", "D" and "B1", respectively, for the sake of convenience. Although the table 22E in the ATM router 19 shown in FIG. 13 is originally as shown in FIGS. 9 and 10B, the table 22E is assumed to be in a similar information structure to the table 22B in the other routers 15 through 18, for the sake of convenience.

For instance, the video client 14A requests of the video server 13 to reserve use of a bandwidth of 10 Mbps (resource request). This request is transferred in an RSVP packet to the video server 13 (Step R1 in FIG. 13). Incidentally, a normal routing process (based on only a destination IP address) is conducted on this RSVP packet (in a direction from the video client 14A to the video server 13).

Assuming now that the RSVP packet is transferred via, for example, the router 17, the router 16 and the router 15, and reaches the video server 13. When receiving the RSVP packet, the video server 13 sends an RSVP packet (destination IP address=C.1) addressed to the video client 14A requesting for securement of a bandwidth of 10 Mbps to the router 15 in order to establish a session for the requested 10 Mbps between the video server 13 and the video client 14A (Step R2 in FIG. 13).

When the router 15 receives the RSVP packet (YES route at Step S21 in FIG. 14), the resource securing unit 22-5 in the forwarding engine 22 confirms whether or not the requested bandwidth can be secured in its own router 15 (Step S22). When the requested bandwidth cannot be secured in its own router 15 as a result, the resource securing unit 22-5 sends back NG information to the video server 13 (from NO route at Step S22 to Step S23). Conversely, when the requested bandwidth can be secured, the resource securing unit 22-5 sends back OK information to the video server 13 (YES route at Step S22 to Step S24).

When the bandwidth can be secured in its own router 15, the RSVP routing determining unit 221 refers to the RSVP IP routing table 22B (Step S25), and checks whether or not internal routing information 22B-1 having idle bandwidth information 22B-2 satisfying the bandwidth (10 Mbps) requested by the received RSVP packet exists in the table 22B (Step S26).

Here, only one piece of routing information 22B-1 (destination IP address=C.1/next router's address=B1: refer to a shaded portion) satisfying the requested bandwidth (10 Mbps) exists in the table 22B (judged YES at Step S26, and judged NO at Step S27), so that the RSVP routing determining unit 221 determines that routing information 22B-1 as routing information for the received RSVP packet.

The determined routing information 22B-1 is moved to the normal IP routing table 22A by the information moving unit 226 (Step S28). Whereby, the RSVP packet and IP packets for the VOD service received thereafter are transferred to a router having the next router's address=B1, that is, the ATM router 19, in the normal routing process (Step R3 in FIG. 13).

When the received packet is other than an RSVP packet (when judged NO at Step S21), or when routing information satisfying the requested bandwidth (10 Mbps) does not exist in the table 22B (when judged NO at Step S26), the internal routing determining unit 22-1 determines the next hop destination for the received packet (performs the normal routing process) on the basis of the normal IP routing table 22A (Step S30).

When plural pieces of routing information 22B-1 satisfying the bandwidth requested by the RSVP packet exist at the above Step S27, the RSVP routing determining unit 221 determines one having the maximum idle bandwidth information 22B-2 as routing information 22B-1 for the received RSVP packet, and the information moving unit 226 moves that routing information 22B-1 to the normal IP routing table 22A (from YES route at Step S27 to Step S29).

Figure 15:
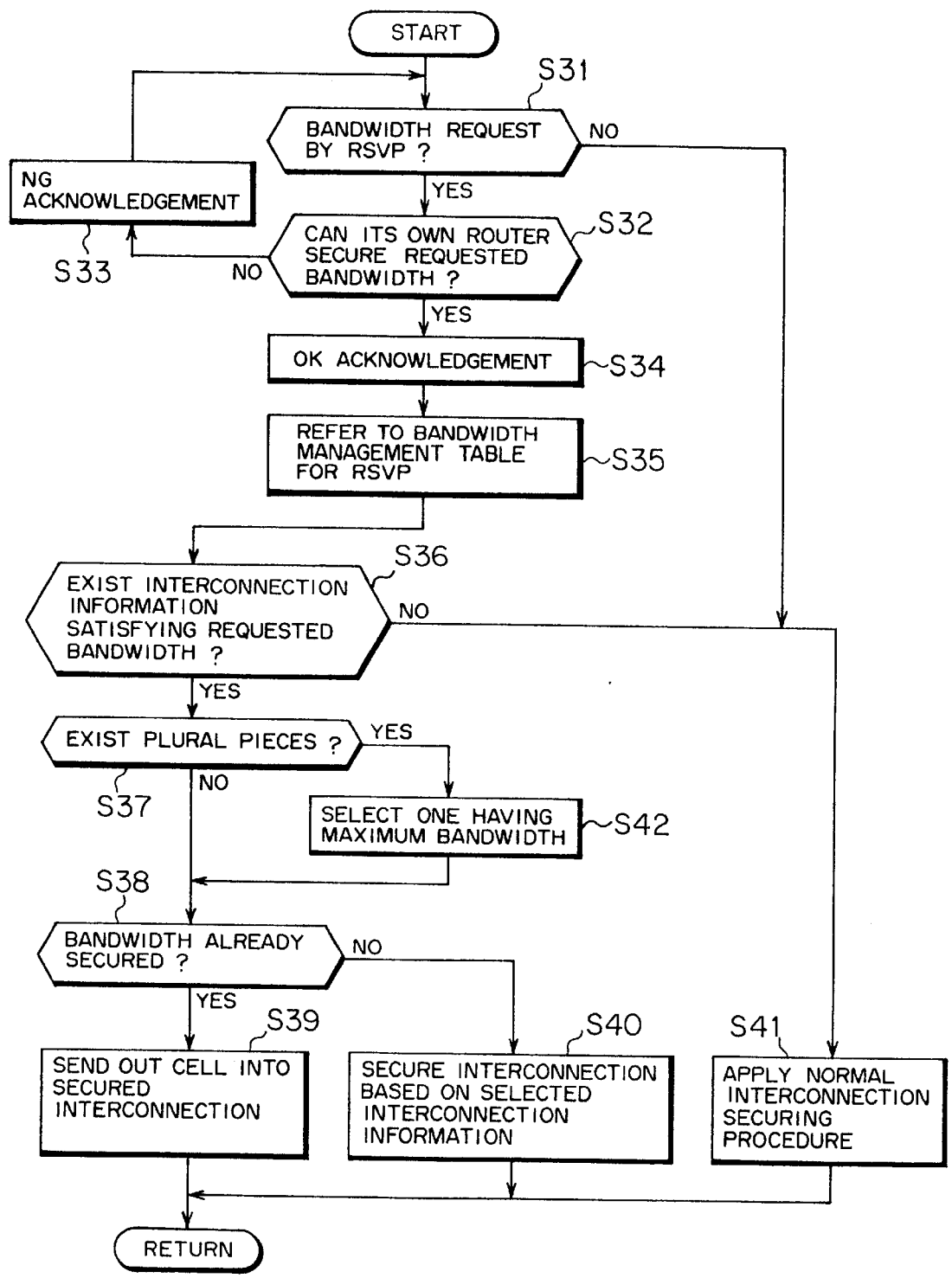
FIG. 15 is a flowchart for illustrating a procedure for determining the next router in the ATM-based IP router according to the embodiment.
Figure 16:
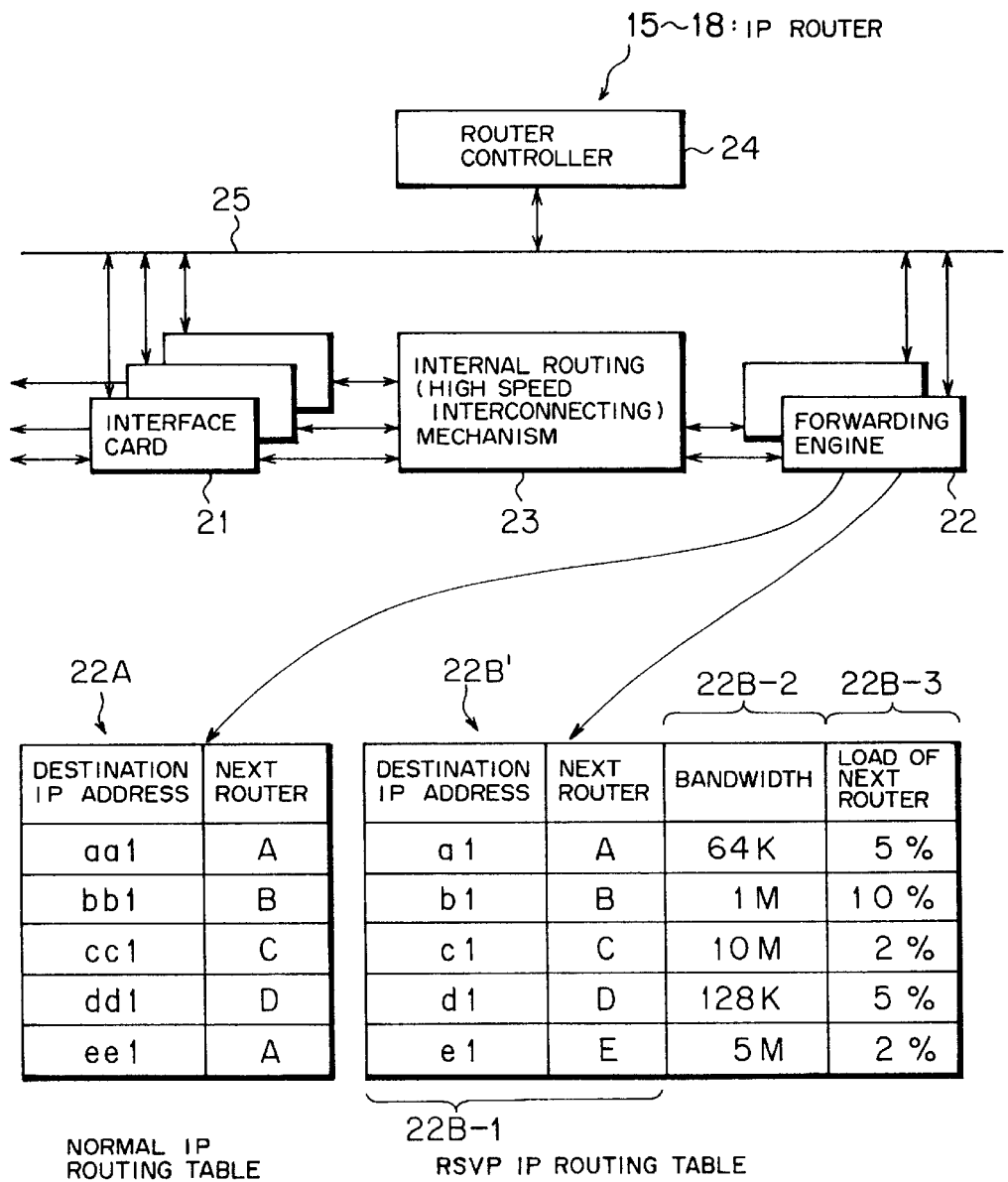
FIG. 16 is a block diagram showing an example of a structure of the IP router when a routing process for an RSVP packet is performed, additionally considering a load of the next router, according to the embodiment.

In the ATM router 19 to which the RSVP packet has been transferred from the router 15 as above, the resource securing unit 198 in the central controller 19-4 confirms whether or not the requested bandwidth (10 Mbps) can be secured in its own router 19 since the received packet is an RSVP packet (since judged YES at Step S31) as shown in FIG. 15 (Step S32).

When the requested bandwidth cannot be secured in its own router 19 as a result, the resource securing unit 198 sends back NG information to the router that is a source of the transferred RSVP packet (from NO route at Step S32 to Step S33). However, the RSVP packet is here transferred to the ATM router 19 according to a determination in the router 15 that the requested bandwidth can be secured in the ATM router 19, so that the requested bandwidth can be secured therein. The resource securing unit 198 thus sends back OK information to the router 15 (from YES route at Step S32 to Step S34).

The RSVP connection determining unit 195 refers to the bandwidth management table for RSVP 22E on the basis of a destination IP address (output VPI/VCI) given to the received RSVP packet (ATM cell) (Step S35), and checks whether interconnection information 22E-1 satisfying the requested bandwidth (10 Mbps) exists in the table 22E (Step S36).

As shown in FIG. 13, only one piece of interconnection information 22E-1 (idle bandwidth=15 Mbps: refer to a shaded portion) satisfying the requested bandwidth (10 Mbps) exists in the table 22E (judged YES at Step S36, and judged NO at Step S37). The RSVP connection determining unit 195 therefore determines (selects) that interconnection information 22E-1 as interconnection information for the received RSVP packet.

The interconnection confirming unit 200 of the interconnection controlling unit 196 checks whether or not an interconnection corresponding to the interconnection information 22E-1 determined by the RSVP connection determining unit 195 is already secured (Step S38). However, the interconnection information 22E-1 existing in the table 22E here means that the corresponding interconnection is already secured, as described above. The interconnection already secured is thus assigned by the interconnection assigning unit 201 for a transfer of the received RSVP packet having been converted into an ATM cell, and the ATM cell is sent out to that interconnection (Step S39).

The received RSVP packet having been converted into the ATM cell is converted into a packet having the original destination IP address (C.1) by a corresponding ATM/IP converting module 19-3, and transferred to the router 17 having the next router's address C.

When the interconnection confirming unit 200 confirms as a result that an interconnection corresponding to the interconnection information 22E-1 determined by the RSVP connection determining unit 195 is not yet secured (when judged NO at Step S38: this case occurs, for example, when the table 22E is created/updated by receiving idle bandwidth information from an adjacent router that can be the next hop destination as will be described later), the interconnection controlling unit 196 secures a new interconnection on the basis of the determined interconnection information 22E-1 (Step S40).

When the received packet is not an RSVP packet (when judged NO at Step S31), or when interconnection information satisfying the requested bandwidth (10 Mbps) does not exist in the table 22E (when judged NO at Step S36), the interconnection determining unit 194 determines a normal interconnection (on the basis of only the destination IP address), whereby a procedure for securing a normal interconnection is carried out by the interconnection controlling unit 196 (Step S41).

When plural pieces of interconnection information 22E-1 satisfying the requested bandwidth exist at the above Step S37, the RSVP connection determining unit 195 determines (selects) one having the maximum idle bandwidth information 22E-2 among them as interconnection information 22E-1 for the received RSVP packet having been converted into an ATM cell (from YES route at Step S37 to Step S42).

The router 17 having received the RSVP packet transferred from the ATM router 19 as above recognizes from the destination IP address (C.1) given to the RSVP packet that the received RSVP packet is addressed to the video client 14A accommodated by itself, secures the requested bandwidth, and transfers the received RSVP packet as a resource securement complete acknowledgement to the video client 14A.

As a result, a session for 10 Mbps is established between the video server 13 and the video client 14A, and the VOD service is initiated. Incidentally, when the video client 14B makes a reservation request, a session is established between the video client 14B and the video server 13 in the similar procedure to the above.

According to this embodiment, each of the router 15 through 18 performs a routing on the basis of the RSVP IP routing table 22B in consideration of at least an idle bandwidth quantity in a router that can be the next hop destination when receiving an RSVP packet. It is therefore possible to largely diminish a probability of wastefully performing a routing process to a router in which a bandwidth according to the RSVP packet cannot be secured, or is hardly secured. Accordingly, a bandwidth requested by the RSVP packet can be certainly guaranteed while an efficient routing is performed, and a communication resource can be effectively used.

According to this embodiment, the router retrieves only in the RSVP IP routing table 22B when receiving an RSVP packet, and when relevant routing information exists therein, the routing information is moved to the normal IP routing table 22A, so that the invention can be realized readily. It is also possible to cope with both An effective routing in which a bandwidth is secured by an RSVP packet and a normal routing.

According to the above embodiment, even the ATM router 19 performing a routing process in a lower layer than TCP/IP layer secures an interconnection in consideration of an idle bandwidth quantity in a router that can be the next hop destination. It is therefore possible to secure a sufficient service quality (guarantee a bandwidth) to the VOD service strict with delay, and prevent a wasteful routing for an RSVP packet.

Particularly, an interconnection once secured because of reception of an RSVP packet is held for a predetermined period, and if an interconnection for a router that is determined as the next hop destination is already secured when another RSVP packet is received, the connection already secured is used (namely, it is possible to cope with it by only changing the interconnection and the bandwidth). As a result, necessity of securing an interconnection each time an RSVP packet is received is largely lessened, thus a processing load in the ATM router 19 (central controller 19-4) is largely reduced.

When a predetermined period is elapsed, the interconnection is released. It is thereby unnecessary to continuously secure an interconnection wastefully, so that a communication resource is effectively used. At this point of time, interconnection information 22E-1 and idle bandwidth information 22E-2 corresponding to the released interconnection are deleted in the bandwidth management table for RSVP 22E, so that a memory resource of the main memory 19-5 is effectively used, and an erroneous determination on the next hop destination is prevented.

Further, each of the routers 15 through 18 and the ATM router 19 can create or update resource management information (tables 22B and 22E) on an adjacent router that was once the next hop destination for a past RSVP packet on the basis of a record of securing a bandwidth in that router. It is therefore possible to automatically hold recent idle bandwidth information 22B-2 (22E-2) in the adjacent router, and readily grasp a recent state of use of the bandwidth in the adjacent router.

Each of the routers 15 through 18 holds created resource management information (routing information 22B-1, idle bandwidth information 22B-2) in the RSVP IP routing table 22B in the order the information was created for a predetermined period (first predetermined period), and when receiving a similar RSVP packet within the predetermined period, performs a routing for the RSVP packet on the basis of the created resource management information. It is therefore possible to reduce a load of routing, and decrease a memory quantity required to hold the information.

When each of the router 15 through 18 cannot secure a bandwidth according to an RSVP packet in a router that is to be the next hop destination, the router can delete resource management information on that router in the tables 22B and 22E since reliability thereof is low. It is therefore possible to prevent an increase of memory quantity because of holding unnecessary resource management information, and prevent an erroneous determination on the next hop destination.

Others

In the above embodiment, the table 22B (22E) is created/updated on the basis of a record of securing a bandwidth in an adjacent router in the past. However, this invention is not limited to this example. It is alternatively possible to periodically receive idle bandwidth information 22B-2 from the adjacent router, for example, so as to create/update the table 22B (22E).

The above embodiment has been described by way of an example where a routing is performed in consideration of a state of use of the bandwidth as a communication resource in an adjacent router when an RSVP packet is received. However, this invention is not limited to this example. It is alternatively possible to perform a routing, additionally considering a rate of use of the CPU (namely, a processing load of the router).

In order to realize this, each of the routers 15 through 18 has an RSVP IP routing table including information as resource management information 22B', in which next router's load information 22B-3 (hereinafter referred to merely "load information 22B-3") additionally corresponded to the routing information 22B-1 and the idle bandwidth information 22B-3, in lieu of the above RSVP IP routing table 22B, in the forwarding engine 22 (memory 22-5).

In the load information 22B-3, the information having a lower numeral value (%) has a lower load of the next router. A process of determining a router that is to be the next hop destination when an RSVP packet is received in this case is performed under conditions as shown in the following Table 1.

TABLE 1 relationship among load of the next router, bandwidth and application information

| load of the next router | bandwidth | priority |
| --- | --- | --- |
| different | different | apply one having the minimum next router's load |
| different | same | apply one having the minimum next router's load |
| same | different | apply one having the maximum bandwidth |
| same | same | apply an arbitrary one |

Figure 17:
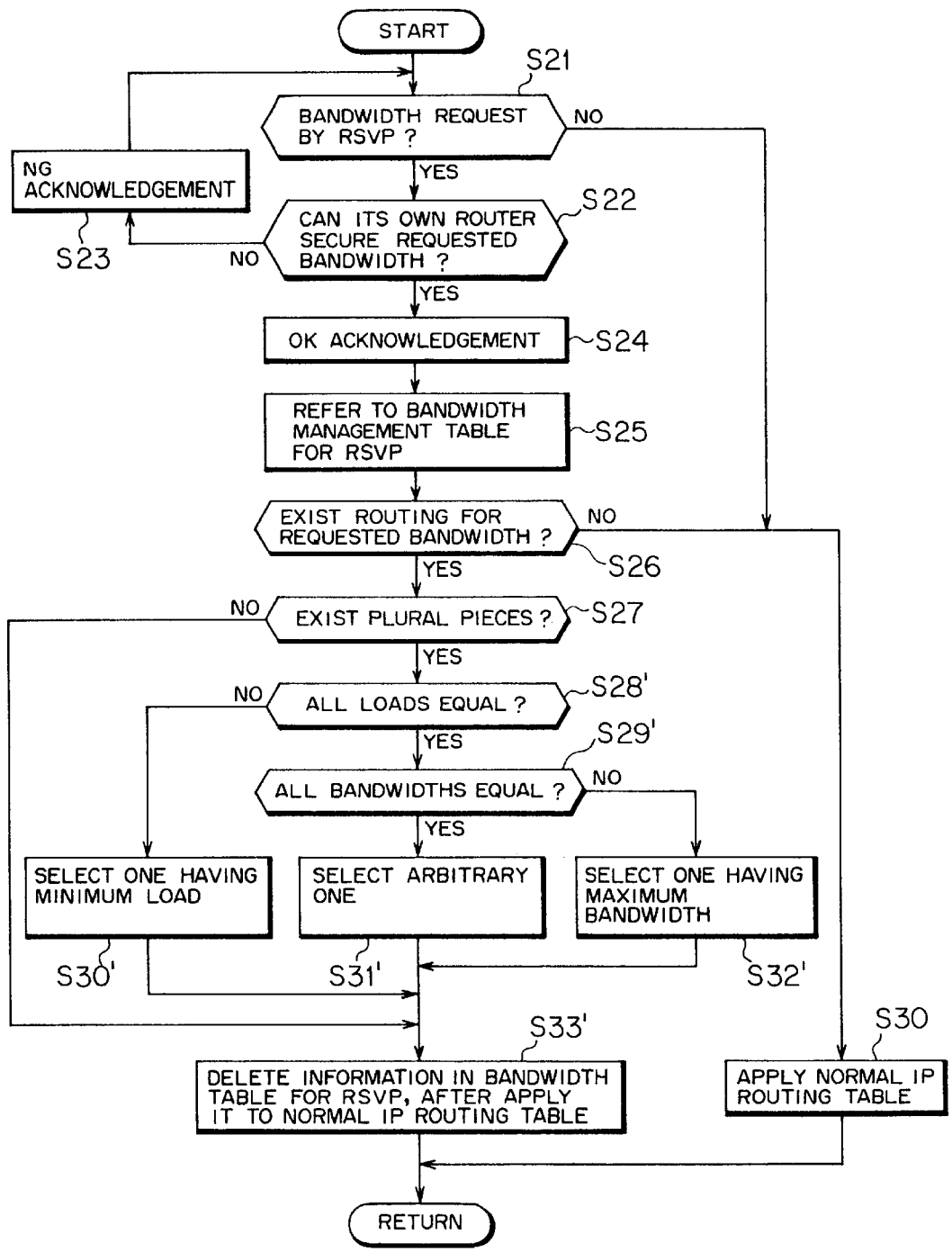
FIG. 17 is a flowchart for illustrating a procedure for determining the next router, additionally considering a load of the next router, according to the embodiment.

Namely, the RSVP routing determining unit 221 determines a router that is to be the next router according to a flowchart (algorithm) shown in FIG. 17, for example. In FIG. 17, a process at Steps S21 through S27 and S30 is similar to the operation described above with reference to FIG. 14, detailed description of which is thus omitted. A process in other essential parts will be now described.

When plural pieces of routing information 22B-1 satisfying a requested bandwidth exist in the RSVP IP routing table 22B (when judged YES at Step S27), the RSVP routing determining unit 221 next compares plural pieces of load information 22B-3 corresponding to the plural pieces of the routing information 22B-1 to check whether or not all pieces of the load information 22B-1 are at the same value (Step S28').

When even one piece of the load information 22B-3 having a different value exists as a result, the RSVP routing determining unit 221 selects a piece of routing information 22B-1 having the minimum load information 22B-3 as routing information for the next hop destination (from NO route at Step S28' to S30'). When all pieces of the load information are at the same value, the RSVP routing determining unit 221 further compares plural pieces of idle bandwidth information 22B-2 to check whether or not all pieces of the idle bandwidth information are at the same value (from YES route at Step S28' to Step S29').

When all the bandwidth values are equal as a result, the RSVP routing determining unit 221 arbitrarily selects only one piece of the routing information 22B-1 as routing information for the next hop destination (from YES route at Step S29' to Step S31'). When even one bandwidth value differs from the others, the RSVP routing determining unit 221 selects a piece of the routing information 22B-1 having the maximum, bandwidth value among them as routing information for the next hop destination (from NO route at Step S29' to Step S32').

The routing information 22B-1 selected (determined) as above is moved to the normal IP routing table 22A by the information moving unit 226 in any case (Step S33'). Whereby, the RSVP packet and IP packets for the VOD service received thereafter are transferred to the determined next hop destination in the normal routing process.

Namely, when each of the routers 15 through 18 receives an RSVP packet, the router carries out a routing in consideration of both an idle bandwidth quantity and a processing load of an adjacent router that can be the next hop destination. In this case, it is therefore possible to further decrease a probability of carrying out a wasteful routing at the time of reception of an RSVP packet as compared with the foregoing embodiment.

When only one piece of routing information 22B-1 satisfying the requested bandwidth exists in the routing table for RSVP 22B (when judged NO at Step S27), that routing information 22B-1 is automatically determined as routing information for the next hop destination, and moved to the normal IP routing table 22A (Step S33').

It is alternatively possible that the ATM router 19 secures (establishes) an interconnection in consideration of both an idle bandwidth quantity and a processing load of an adjacent router in a manner similar to the above. Further, the load information 22B-3 in the RSVP IP routing table 22B' can be obtained by, for example, periodically inquiring of an adjacent router about a processing load.

In the above example, both an idle bandwidth quantity and a processing load of an adjacent router are considered. However, it is alternatively possible to consider only a processing load. It is still alternatively possibly to consider one (for example, a memory quantity or the like) other than bandwidth and rate of use of CPU, as a state of use of the communication resource.

Note that the present invention is not limited to the above examples, but can be modified in various ways without departing from a scope of the invention.

What is claimed is:

1. A routing apparatus comprising:
   a routing controlling unit controlling transfer of received packet data to another routing apparatus that is a next hop destination based on destination information of said packet data;
   a resource management unit managing resource management information regarding a communication resource in at least one adjacent routing apparatus, said at least one adjacent routing apparatus being a next hop destination, wherein said resource management information is created and updated based on a result of securing a communication resource in said at least one adjacent routing apparatus that was previously a next hop destination for a past reservation request packet, said resource management information being, temporarily stored for a predetermined period of time; and
   a determining unit securing, within said predetermined period of time, a communication resource upon receiving a reservation request packet having packet data for a reservation request, and determining a next hop destination for forwarding the received reservation request packet on the basis of destination information given by said packet data and said temporarily stored resource management information.

2. The routing apparatus according to claim 1, wherein said resource management unit holds at least routing information on said at least one routing apparatus that can be the next hop destination and state information on the communication resource, and where said routing and state information corresponds to said resource management information;
   said determining unit is configured as a reservation request routing determining unit determining routing information for the next hop destination in which a communication resource according to said reservation request packet data can be secured on the basis of said state information and said routing information; and
   said routing controlling unit controlling said routing on the basis of said state information and said routing information determined by said reservation request routing determining unit.

3. The routing apparatus according to claim 1, wherein said routing controlling unit includes a resource management information creating/updating unit creating and updating said resource management information on the basis of a result of securing a communication resource in an adjacent routing apparatus that was previously said next hop destination for the past reservation request packet data.

4. The routing apparatus according to claim 3, wherein said resource management information creating/updating unit comprises:
   a timer unit measuring said predetermined period from when said resource management information is created;
   a information confirming unit confirming whether or not resource management information held longer than said predetermined period exists in said resource management unit on the basis of time-measuring information of said timer unit; and
   an information deleting unit deleting resource management information in said resource management unit when said information confirming unit confirms that said resource management information was held longer than said predetermined period in said resource management unit.

5. The routing apparatus according to claim 3, wherein said resource management information creating/updating unit comprises:
   a monitoring unit monitoring whether or not a communication resource according to said reservation request packet data can be secured in said next hop destination;
   an information confirming unit confirming whether or not resource management information corresponding to said next hop destination exists in said resource management unit when said monitoring unit confirms that said communication resource cannot be secured in said next hop destination; and
   an information deleting unit deleting said resource management information in said resource management unit when said information confirming unit confirms that said resource management information corresponding to said next hop destination cannot be secured.

6. A routing apparatus comprising:
   an interconnection controlling unit controlling an interconnection to transfer received packet data to at least one adjacent routing apparatus that is a next hop destination based on destination information of said received packet data;
   a resource management unit managing resource management information regarding a communication resource in said at least one adjacent routing apparatus, said at least one adjacent routing apparatus being the next hop destination and, wherein said resource management information is created and updated based on a result of securing a communication resource in said at least one adjacent routing apparatus that was once a next hop destination for a past reservation request packet, said resource management information being temporarily stored for a predetermined period of time; and a determining unit securing, within said predetermined period of time, a communication resource according to a reservation request upon receiving a reservation request packet having packet data for said reservation request, and determining a next hop destination on the basis of destination information given by said packet data and said temporarily stored resource management information.

7. The routing apparatus according to claim 6, wherein said resource management unit holds at least interconnection information on said at least one adjacent routing apparatus that can be the next hop destination and state information on a communication resource, and where said routing and state information corresponds to said resource management information;

said determining unit is configured as a reservation request connection determining unit determining interconnection information for the next hop destination in which a communication resource according to said reservation request packet data can be secured on the basis of said state information and said interconnection information; and said interconnection controlling unit controls said interconnection on the basis of said state and interconnection information determined by said reservation request connection determining unit.

8. The routing apparatus according to claim 6, wherein said interconnection controlling unit comprises:

an interconnection confirming unit confirming whether or not the interconnection for said next hop destination determined by said determining unit is already secured; and an interconnection assigning unit assigning said interconnection to a packet transferring process when said interconnection confirming unit confirms that said interconnection is already secured.

9. The routing apparatus according to claim 6, wherein said interconnection controlling unit comprises:

a resource management information creating/updating unit creating and updating said resource management information on the basis of a result of securing a communication resource in said at least one routing apparatus that was previously said next hop destination for a past reservation request packet data.

10. The routing apparatus according to claim 9, wherein said interconnection controlling unit comprises:

a timer unit measuring said predetermined period from when an interconnection for said reservation request packet data is established;

an interconnection continuative securing unit continuing securement of said interconnection until said predetermined period is elapsed in said timer unit;

an interconnection releasing unit releasing said interconnection when said predetermined period is elapsed in said timer unit; and said resource management information creating/updating unit comprises:

an information deleting unit deleting created resource management information on the next hop destination corresponding to the interconnection released by said interconnection releasing unit in said resource management unit.

11. The routing apparatus according to claim 9, wherein said resource management information creating/updating unit comprises:

a monitoring unit monitoring whether or not a communication resource according to said reservation request packet data can be secured in said at least one adjacent routing apparatus;

an information confirming unit confirming whether or not resource management information on said next hop destination exists in said resource management unit when said monitoring unit confirms that said communication resource cannot be secured in said next hop destination; and a information deleting unit deleting said resource management information in said resource management unit when said information confirming unit confirms that said resource management information on the next hop destination in which said communication resource cannot be secured exists in said resource management unit.

12. The routing apparatus according to claim 1, wherein said communication resource is a bandwidth.

13. A routing method used in a communication network including a plurality of routing apparatuses each handling packet data for a desired communication service comprising the steps of:

receiving packet data for a communication resource reservation request;

upon receiving said packet data, securing a communication resource via accessing temporarily stored resource management information according to the communication resource reservation request, said resource management information storing past results of securing a communication resource in at least one adjacent routing apparatus and said resource management information being temporarily stored for a predetermined period of time; and carrying out a routing process within said predetermined period of time for transferring the reservation request to said at least one adjacent routing apparatus that is a next hop destination based upon a consideration of at least a past result of securing a communication resource in said at least one adjacent routing apparatus that was once a next hop destination for a past reservation request packet.

* * * * *